(12) United States Patent
Väänänen et al.

(10) Patent No.: US 10,795,446 B2
(45) Date of Patent: Oct. 6, 2020

(54) PORTABLE ELECTRONIC HAPTIC VISION DEVICE

(71) Applicant: Seventh Sense OÜ, Harjumaa Tallinn (EE)

(72) Inventors: Johannes Väänänen, Tallinn (EE); Mika Pukari, Oulu (FI)

(73) Assignee: Seventh Sense OÜ, Harjumaa Tallinn (EE)

( * ) Notice: Subject to any disclaimer, the term of this patent is extended or adjusted under 35 U.S.C. 154(b) by 0 days.

(21) Appl. No.: 16/355,333

(22) Filed: Mar. 15, 2019

(65) Prior Publication Data

US 2019/0332175 A1    Oct. 31, 2019

Related U.S. Application Data

(60) Provisional application No. 62/662,616, filed on Apr. 25, 2018.

(51) Int. Cl.
| | | |
|---|---|---|
| *G06F 3/01* | (2006.01) | |
| *H04N 5/232* | (2006.01) | |
| *G06T 7/73* | (2017.01) | |
| *G06K 9/32* | (2006.01) | |

(52) U.S. Cl.
CPC ........... *G06F 3/016* (2013.01); *G06K 9/3241* (2013.01); *G06T 7/73* (2017.01); *H04N 5/23296* (2013.01); *G06T 2207/10028* (2013.01)

(58) Field of Classification Search
CPC . G06F 3/016; G06T 7/73; G06T 2207/10028; G06K 9/3241; H04N 5/23296

USPC ........................................................ 340/407.2
See application file for complete search history.

(56) References Cited

U.S. PATENT DOCUMENTS

| | | | |
|---|---|---|---|
| 8,123,660 B2 | 2/2012 | Kruse et al. | |
| 2002/0021277 A1* | 2/2002 | Kramer | G06F 3/016 345/156 |
| 2015/0346722 A1* | 12/2015 | Herz | G05D 1/0038 701/2 |
| 2016/0166930 A1 | 6/2016 | Brav et al. | |
| 2016/0309827 A1 | 10/2016 | Dodson | |
| 2016/0321955 A1* | 11/2016 | Zhu | G09B 21/007 |
| 2017/0064209 A1* | 3/2017 | Cohen | H04N 5/23296 |
| 2017/0300115 A1* | 10/2017 | Kerr | G06F 3/016 |
| 2018/0036531 A1* | 2/2018 | Schwarz | G06F 3/015 |
| 2018/0114063 A1* | 4/2018 | Wexler | G06K 9/00671 |
| 2019/0004602 A1* | 1/2019 | Holbery | G06F 1/163 |
| 2019/0011965 A1* | 1/2019 | Seyed | G06F 1/203 |
| 2019/0064927 A1* | 2/2019 | Tachi | G06F 3/0383 |
| 2019/0065854 A1* | 2/2019 | Krishnan | G06K 9/00671 |
| 2019/0087050 A1* | 3/2019 | Mani | G06F 3/0416 |

(Continued)

*Primary Examiner* — Omar Casillashernandez
(74) *Attorney, Agent, or Firm* — Patterson + Sheridan, LLP

(57) ABSTRACT

The invention provides a portable electronic haptic vision device configured to be attached to or worn by a user. The portable electronic haptic vision device is arranged to provide haptic feedback with pressurized air on skin of the user based upon detected objects in the surroundings of the user. The information about the detected objects in the surroundings is captured with a digital camera, radar and/or sonar device, and/or a 3-D capture device such as a 3-D scanner or 3-D camera attached to the portable electronic haptic vision device. The portable electronic haptic vision device is realised as a helmet with at least two cameras placed in the position of the eyes of the user, or as a t-shirt or other wearable.

32 Claims, 15 Drawing Sheets

(56) References Cited

U.S. PATENT DOCUMENTS

2019/0102986 A1\* 4/2019 Nelson .................... G06F 3/011
2019/0332175 A1\* 10/2019 Vaananen ............ G09B 21/003

\* cited by examiner

PORTABLE ELECTRONIC HAPTIC VISION DEVICE

CROSS-REFERENCE TO RELATED APPLICATIONS

This Application claims the benefit of U.S. Provisional Application 62/662,616 filed on Apr. 25, 2018, which is herein incorporated by reference.

BACKGROUND

Field

The invention generally relates to portable electronic devices, and more particularly to portable electronic haptic vision device

Description of the Related Art

Blindness or low-vision related medical conditions are disabilities that affect millions of people in the world. People with such conditions often find it difficult to perform normal tasks, such as crossing a road, picking an object, etc. In order to assist people with such medical conditions, various human-machine interface devices have been developed.

In these prior art human-machine interface devices a user typically provides certain inputs to control the human machine interface device and this device provides feedback of the environment based on the inputs. The feedback from the system may be a haptic feedback, an audio feedback, and/or a visual feedback. Many such systems that provide haptic feedback allow users to feel and see the environment around them, but require the user's attention and/or focus to adapt to the kind of feedback being communicated.

The haptic feedback may be in the form of a force implied on the user or a vibrotactile alert to the user.

Often the haptic feedback providing modules render the systems complex and non-economical. Additionally, the systems providing haptic feedback may cause abrasions to the user due to the extensive force applied on the user over long time frames.

Furthermore, some of these systems require user input. While the user input allows flexibility, there are diminishing returns for requiring the user to provide ever more user input, as the provision of the user input itself is time-consuming and laborious to the users of these prior art haptic systems.

A protective helmet with an integrated display is disclosed in US 20160309827A1. This document is cited here as reference.

A wearable navigation assistance for the vision-impaired is disclosed in US 20160321955A1. This document is also cited here as reference.

A system for providing haptic feedback to users is disclosed in US 20160166930A1.

This document is also cited here as reference.

A method and apparatus for providing communications with haptic cues is disclosed in U.S. Pat. No. 8,123,660B2. This document is also cited here as reference.

However, the prior art references are deficient in techniques of providing haptic feedback to the user by gathering information around the user.

SUMMARY

It is an object of the invention to address and improve the aforementioned deficiencies in the prior art.

It is an object of the invention to provide haptic feedback, by the portable electronic haptic vision device, with pressurized air on skin of the user based upon detected objects in the surroundings of the user.

It is an object of the invention to provide a portable electronic haptic vision device configured to be attached to or worn by a user, and arranged to provide haptic feedback with pressurized air on the skin of the user based upon detected objects in the surroundings of the user.

In one aspect of the invention, information about the objects in the surroundings is captured with a digital camera, radar and/or sonar device attached to the portable electronic haptic vision device. The objects may be detected by visual imagery, but alternatively they may be detected by radar or sonar or 3-d capture devices or the like, and the location and size and physical appearance of the objects may be captured in data form, without using an image. Images may be recorded as video, and object data may be recorded continuously as well, in accordance with the invention. These methods to sense the environment may be used individually and separately, or together in a mix.

In a further aspect of the invention, information about the visual objects in the surroundings is captured within the field of view of the user, creating a natural sense-based vision.

In another aspect of the invention, information about the visual objects in the surroundings is captured with a 360 degree field of view attached to the portable electronic haptic vision device, capturing all of the spatial surroundings around the user.

In another aspect of the invention, based upon data obtained from the surroundings, any of the following is drawn on the skin of the user with pressurized air:

routes, pedestrian walkways, streets, stairs, corridors, furniture, walls, obstacles;

impressions and expressions from another person's face; and video signal obtained from a screen, such as a movie or computer game.

A software program product in accordance with the invention a for a portable electronic haptic vision device is configured to be attached to or worn by the user, and arranged to provide haptic feedback with pressurized air on the skin of the user based upon objects in the surroundings of the user, characterized by the software program product comprising:

an image capturing module and/or a 3D capturing device to capture images and/or data from the surroundings of the user;

a processing module to process information gathered from the image capturing module and/or the 3D capturing device, a sensor module, and/or an input module; and a driving module to direct at least one nozzle to spray pressurized air on skin of the user based upon processed information from the processing module.

A method for operating a portable electronic haptic vision device is configured to be attached to or worn on the head of a user, and arranged to provide haptic feedback with pressurized air on the skin of the user based upon the visual objects in the surroundings of the user and is characterized by the following steps, capturing images, video or object data from the surroundings of the user using an image capturing module and/or the 3D capturing device;

processing information gathered from the image capturing module and/or the 3D capturing device with a processing module; and directing pressurized air on skin of the user, by a driving module, based upon processed information in the processing module via at least one nozzle.

The invention results in a portable electronic haptic vision device that is configured to be attached to or worn on the head, or attached to, or be embedded in, a t-shirt of a user. The portable electronic haptic vision device provides haptic feedback with pressurized air on skin of the user based upon detected objects in the surrounding of the user. The portable electronic haptic vision device can be deployed in a tailor made helmet that is designed based on dimension of forehead of the user, or it may be made in one size that fits all. Then, the nozzles of the portable electronic haptic vision device are configured to move along the width of the forehead the user, thereby covering a larger travel distance as opposed to conventional method of touch based feedback devices. In the t-shirt embodiment, the nozzles of the portable electronic haptic vision device are configured to move along the chest portion of the user, thereby covering a larger travel distance and feedback area as opposed to conventional method of touch-based feedback devices. An option of controlling the temperature of the pressurized air, by the user, is available in the portable electronic haptic vision device. The portable electronic haptic vision device includes one pump and/or compressed air tank and one nozzle that is easy to implement and control. Further, the user can regulate the pressure of the air that is used to draw on the skin of the user. In addition, the user can also control the image capturing module and/or the 3D capturing device and further decide the image to be drawn on the skin of the user.

The invention has sizable advantages. The portable electronic haptic vision device of the present disclosure eliminates the requirement of contact with the skin of the user to draw contents of the captured image and/or video frames of the environment in and around the user. As such, any abrasion to the skin of the user is also eliminated, which otherwise posed problems for the user. Especially the use of the 3D capturing device reduces the communicated data footprint in comparison to the use of imagery, and therefore makes the portable electronic haptic vision device to consume less processing power and bandwidth. Non-visual 3D capturing devices have the added advantage of working in the dark. The portable electronic haptic vision device can be implemented with very few user inputs, being easily operable by the user. In the case of the portable haptic vision device being attached or worn on the head of the user, noise generated by the airstream of the one or more nozzles may disturb user's hearing. However, when the portable electronic haptic vision device is attached to the t-shirt of the user which is at a distance from the head and ears of the user, the noise generated by the airstream of the one or more nozzles does not interfere with the user's hearing.

The best mode of the invention is considered to be a portable electronic haptic vision device that is configured to be attached to or be embedded in a t-shirt of a user, and arranged to provide haptic feedback with pressurized air on chest portion of the user based upon visual objects in the surroundings of the user. The 3D capturing device is adapted to capture information, such as distance, location, coordinates, characteristics, of the objects in the surroundings of the user. The information about the visual objects captured using the 3D capturing device may be recorded and stored as numeric data. Based on the captured object information, interpreted information describing these objects is created. The interpreted information may be data corresponding to a potential obstacle to the user. The interpreted information is transmitted through the user's sensory to the brain by "drawing" on the chest portion of the user, with one or more air nozzles. In an example, distance, location, coordinates, and/or characteristics corresponding to the interpreted information may be drawn on the chest portion of the user with one or more air nozzles.

Some of the embodiments are described in the dependent claims.

DETAILED DESCRIPTION

The present disclosure provides a portable electronic haptic vision device, method, and a software program product for providing haptic feedback by drawing on the skin of the user with pressurized air based upon a video and/or image obtained from the surroundings.

A portable electronic haptic vision device is configured to be attached to or worn on by a user, and arranged to provide haptic feedback with pressurized air on the skin of the user based upon visual objects in the surroundings of the user. Information about the visual objects in the surroundings is captured with a digital camera, 3D capture device, radar and/or sonar device attached to the portable electronic haptic vision device. The surroundings can also be recorded as video.

Further, information about the visual objects in the surroundings is captured within the field of view of the user, creating a natural sense-based vision. Based on the recorded surroundings, for example any of the following is drawn on the skin of the user with pressurized air: routes, pedestrian walkways, streets, stairs, corridors, furniture, walls, obstacles, impressions and expressions from another person's face.

Figure 1A:
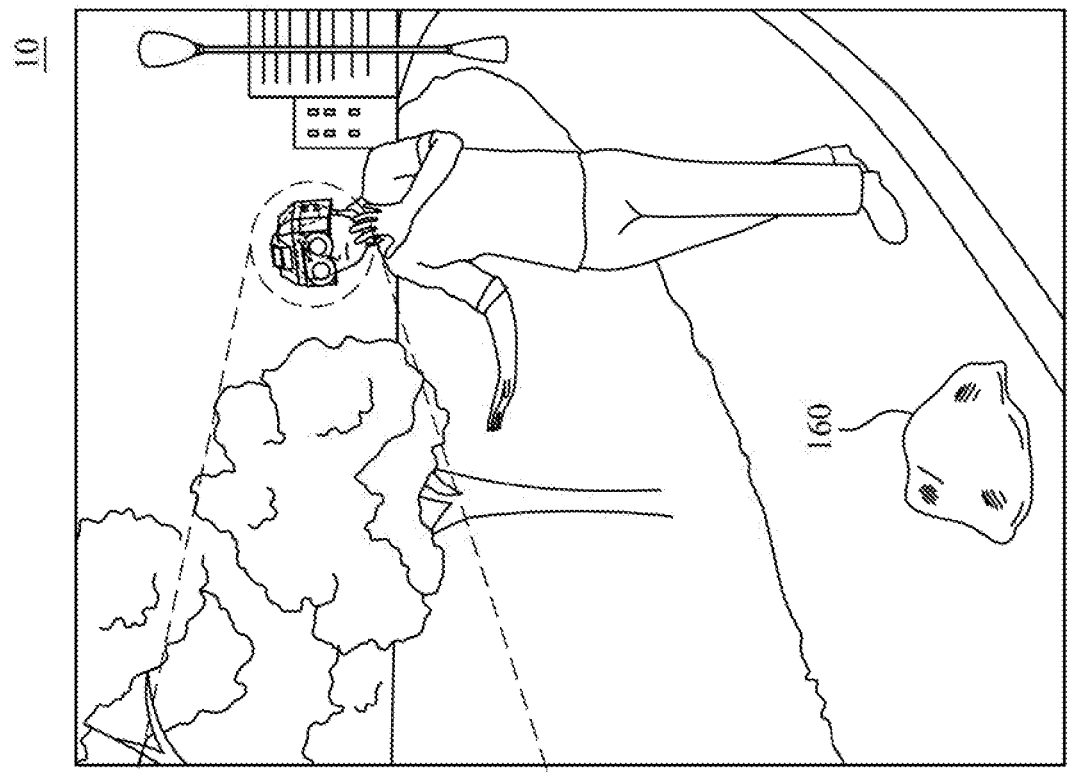
FIG. 1A demonstrates an embodiment 10 of a portable electronic haptic vision device, in accordance with the invention as a block diagram.
Figure 1A:
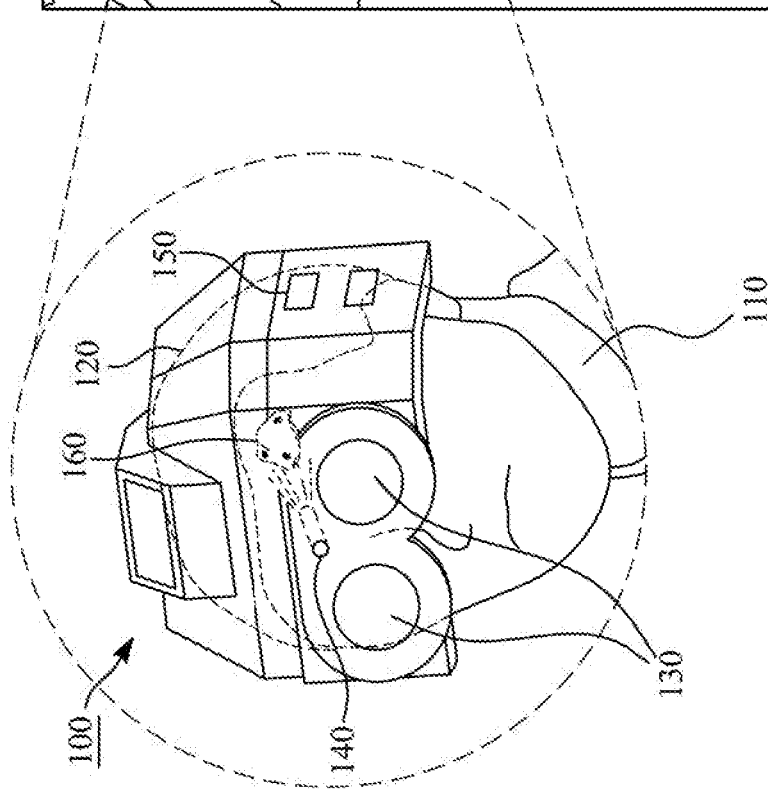

FIG. 1A demonstrates an embodiment 10 of a portable electronic haptic vision device 100 that assists a user 110, for example, a blind or a low-vision person to observe and/or sense the environment through tactile feedback. The portable electronic haptic vision device 100 draws an image and/or shape of the objects surrounding the user 110, on the skin of the user 110. The usage of the portable electronic haptic vision device 100 may not be confined to the need of a blind person. In some implementations, the portable electronic haptic vision device 100 may be used in the artificial reality of a computer game.

The portable electronic haptic vision device 100 is configured to be attached to or worn on a head 120 of the user 110. Although, in the present embodiment, the portable electronic haptic vision device 100 is configured to be attached to or worn on the head 120 of the user 110, in alternative embodiments, the portable electronic haptic vision device 100 may be configured to be attached to any other body part, for example an arm of the user 110, or may be realised as wearable device, e.g. a t-shirt. Further, the portable electronic haptic vision device 100 is arranged to provide haptic feedback with pressurized air on skin of the user 110. In an example, the haptic communication recreates the sense of touch by applying forces, vibrations, or motions to the user 110.

Figure 1B:
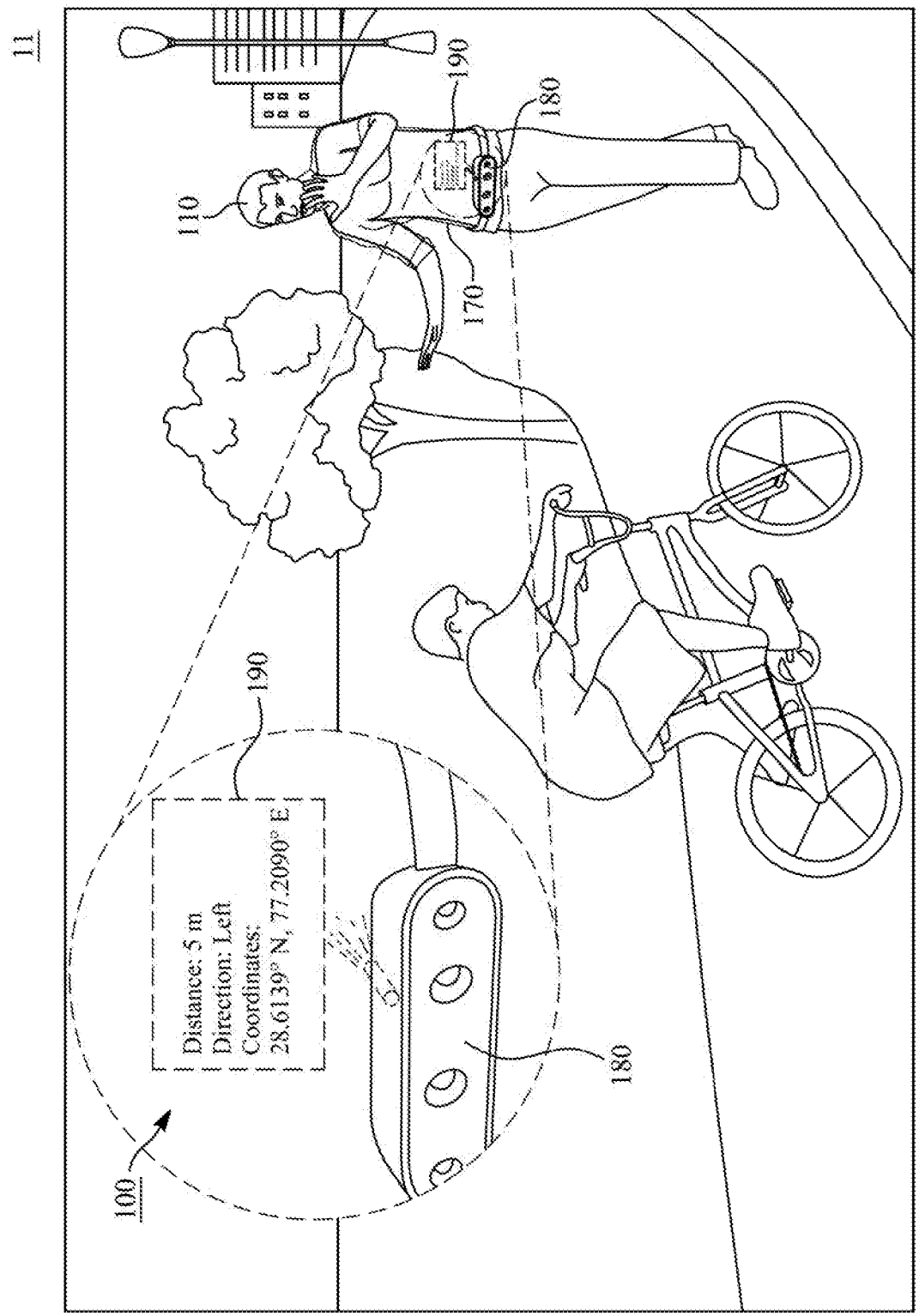
FIG. 1B demonstrates an embodiment 11 of the portable electronic haptic vision device, in accordance with the invention as a block diagram.

The portable electronic haptic vision device 100 includes an image capturing module 130 and/or 3D capturing device 180 (shown in FIG. 1B). In an embodiment, the image capturing module 130 may be embodied as a digital camera 130. For the purpose of description, the terms image capturing module 130 and the digital camera 130 may be interchangeably used. In an example, the image capturing module 130 may include a plurality of digital cameras located at different positions on the portable electronic haptic vision device 100. In one example, the image capturing module 130 may include a digital camera located on the front portion of the portable electronic haptic vision device 100. In another example, the image capturing module 130 may include a digital camera located on the back portion of the portable electronic haptic vision device 100. In yet another example, the image capturing module 130 may include digital cameras located both on front and back portions of the portable electronic haptic vision device 100. The digital camera 130 and/or the 3D capturing device 180 is adapted to capture information about the visual objects in the surroundings of the user 110. The information about the visual objects captured using the digital camera 130 and/or the 3D capturing device 180 may be recorded as videos or images. Further, the portable electronic haptic vision device 100 captures information about the visual objects in the surroundings within the field of view of the user 110, creating a natural sense-based vision. In an example, the visual object surrounding the user 110 may be a rock 160. The image of the rock 161 is captured by the digital camera 130 and/or the 3D capturing device 180. In another example, when the user 110 is conversing with another person (not shown), the digital camera 130 and/or the 3D capturing device 180 attached to the portable electronic haptic vision device 100 can be used to observe and/or capture the look, joy, sorrow, disappointment, laughter, etc., being expressed on the other person's face. In yet another example, the digital camera 130 and/or the 3D capturing device 180 is also capable of capturing images of the routes, such as sidewalks, street, stairs, corridor, furniture, walls and obstacles along the way, or walkers etc. In another example, the digital camera 130 and/or the 3D capturing device 180 may capture an image on a screen, for example, an image of a movie or a computer game.

In an embodiment, the image capturing module 130 and/or the 3D capturing device 180 may include a radar and/or a sonar device attached to the portable electronic haptic vision device 100. In an embodiment, the radar and/or sonar device captures the information about the objects, such as distance from the user, in the surroundings of the user 110, for example when it is dark or the objects are obstructed and non-visual.

Based on the captured image, video and/or data from the surroundings, an interpreted image 160 of the surroundings is created. The interpreted image 160 is transmitted through the user's sensory to the brain by "drawing" on the skin of the user 110. For example, to the forehead with one or more air nozzles 140. In an example, predetermined symbols and/or patterns corresponding to interpreted image 160 may be drawn on the skin of the forehead of the user 110 with one or more air nozzles 140.

The portable electronic haptic vision device 100 further includes a sensor module 150. In an example, the sensor module 150 may be used to track movement of the user 110. For the purpose of description, the sensor module 150 may be interchangeably referred to as the sensors 150. In an example, the sensors 150 may include a motion sensor configured to track movement of the user 110, and location sensor such as GPS to track the location of the user. In another example, the sensors 150 may also feature an eye movement tracking sensor configured to track movement of the eyes of the user 110. In another example the sensors 150 may zoom the camera in and/or out to provide haptic feedback of objects nearer or further in distance, respectively.

In an alternate embodiment, requirement of the user input is eliminated, as the 3D capturing device 180 and sensor device captures information of the surrounding objects on a real time basis and provides distance, location, and coordinates of the visual objects. In such an embodiment, when the user 110 moves from one location to another location, the 3D capturing device 180 captures information of the visual objects around the current location of the user 110 and provides distance, location, and coordinates of the visual objects.

The portable electronic haptic vision device 100 may further include a controller (not shown). The portable electronic haptic vision device 100 is adapted to control and/or operate the image capturing module 130 and/or the 3D capturing device 180 and the sensors 150. The controller includes a memory medium adapted to store information about the objects in the surroundings of the user 110 captured by the digital camera 130 and/or the 3D capturing device 180. The memory medium is also adapted to store information gathered by the sensors 150. In an embodiment, the memory medium is capable of storing multitude of data of objects which assists the processing module 400 (shown in FIG. 4) to analyse and identify one or more objects in the captured image(s). Typically a translation set converting detected objects to haptic symbols is stored. The memory may be volatile or non-volatile in accordance with the invention. Typically the haptic symbols and the translation set are in the non-volatile memory or a data storage means. Typically, the current recording of images is in the volatile memory.

Any features of embodiment 10 may be readily combined or permuted with any of the other embodiments 11, 20, 30, 40, 50, 60, 70, 80, 90, 91, 92, 93, 94 and/or 95 in accordance with the invention.

FIG. 1B demonstrates an embodiment 11 of the portable electronic haptic vision device 100 that assists the user 110, for example, a blind or a low-vision person to observe and/or sense the environment through tactile feedback. The portable electronic haptic vision device 100 is configured to be attached to or worn on an apparel of the user 110. Here, the portable electronic haptic vision device 100 is configured to be attached to the t-shirt 170 of the user 110. In alternative embodiments, the portable electronic haptic vision device 100 may be configured to be attached to any other clothing apparel, such as a sweatband, a cap, a glove and/or other smart clothes/wearables. In one example, the 3D capturing device 180 may be located on the front portion of the t-shirt 170 of the user 110. In another example, the 3D capturing device 180 may be located on the back portion of the t-shirt 170 of the user 110. In yet another example, the 3D capturing device 180 may be located both on front and/or back portions of the t-shirt 170 of the user 110.

The portable electronic haptic vision device 100 is arranged to provide haptic feedback with pressurized air on the chest portion and/or back portion of the user 110. In an example, a haptic communication recreates the sense of touch by applying forces, vibrations, or motions on the chest portion of the user 110.

In an example, the portable electronic haptic vision device 100 includes a 3D capturing device 180 that may be attached to different apparel worn by the user 110. In an example, the 3D capturing device 180 may be a Microsoft Kinect™ device to capture information of the visual objects in the surroundings of the user 110. More particularly, the 3D capturing device 180 may be a MS Kinect 3D point cloud capturing apparatus. In another example, the 3D capturing device 180 may be a FRAMOS™ camera to capture information of the visual objects in the surroundings of the user 110. The 3-D capturing device 180 may also be a 3-D scanner or a 3-D camera in accordance with the invention.

The 3D capturing device 180 may include multiple cameras to capture different views of the visual objects in the surroundings. The 3D capturing device 180 may also include an IR emitter configured to project a pattern of infrared light into the surroundings of the user 110. Further, the 3D capturing device 180 may include a depth sensor (not shown) for measuring the three-dimensional shape of the visual object in the surroundings. More specifically, the depth sensor may be configured to analyse the IR pattern received from the surroundings for measuring a 3D shape of the visual object in the surroundings.

The depth sensor may include an infrared laser projector combined with an active-pixel sensor (APS), such as complementary metal-oxide-semiconductor (CMOS). The infrared laser projector may be configured to capture the 3D shape of the visual object in the surroundings, based on a difference between the emitted IR patterns from the IR emitter and the received IR patterns from the surroundings. Further, the infrared laser projector may capture the 3D shape of the visual object in a form of a depth map that contains a range of discrete measurements pertaining to the object(s) located in the surroundings. More specifically, the 3D shape of at least one object may be captured as a point cloud which contains a set of data points pertaining to the object in a three dimensional coordinate system. The set of data points may include a set of geometrical characteristics of the visual object in the surrounding. The set of geometrical characteristics may include, but not limited to, distance, location, coordinates, spatial distance data, characteristics, of the visual objects in the surroundings of the user 110. In an example, the point cloud may include a plurality of coordinates defined by X, Y, and Z coordinates representing an external surface of the detected object located in the surroundings.

Based on the captured information pertaining to the set of geometrical characteristics of the visual object, an interpreted information 190 of the detected objects is derived. The interpreted information 190 may be data related to a potential obstacle to the user 110. In an example, the interpreted information 190 may be related to a distance of the potential obstacle from the user 110 in the surroundings. The interpreted information 190 may represent only the geometrical characteristics, such as proximity/location of the potential obstacle in the surroundings, and not any visual characteristics, such as colour or texture of the potential obstacle.

In an example, as shown in FIG. 1B, where the visual object surrounding the user 110 is a bicycle, the 3D capturing device 180, in addition to capturing the information about the bicycle, determines distance, location, coordinates, and/or characteristics of the bicycle. An interpreted information 190 of the visual objects is derived, based on the captured information.

When the potential obstacle is the bicycle ridden by a person, the interpreted information 190, derived from the captured information, may be a location of the bicycle with respect to the user 110 in the surroundings. In this example, when the potential obstacle is a bicycle ridden by a person, the interpreted information 190, derived from the captured information, may be a distance of the bicycle i.e. 5 m from the user 110 in the surroundings. In particular, the interpreted information 190 may represent only the geometrical characteristics, such as proximity/location of the bicycle in the surroundings, and not any visual characteristics, such as colour or texture of the bicycle.

The interpreted information 190 may be in numeric data form or alphanumeric data form and stored in a memory medium of the portable electronic haptic vision device 100. Since the interpreted information 190 is void of visual characteristics, such as colour or texture, of potential obstacles in surroundings of the user 110, the generated numeric data or alphanumeric data consumes less space in the memory medium compared to storing of information captured by the 3D capturing device 180. Further, owing to the size of the numeric and/or alphanumeric data, data transmission and management becomes easy.

The portable electronic haptic vision device 100 further includes the one or more nozzles 140 to spray pressurized air on the chest portion of the user 110 based on the interpreted information 190. The interpreted information 190 is transmitted through the user's sensory to the brain by "drawing" on the chest portion of the user 110, with one or more air nozzles 140. In an example, the interpreted information 190, such as distance, location, coordinates, and/or characteristics corresponding to the interpreted information 190 may be drawn on the chest portion of the user 110 by the one or more air nozzles 140 as a haptic signal.

In one example, as shown in FIG. 1B, a distance of the bicycle e.g. meters from the user 110 may be drawn on the chest portion of the user 110, by drawing e.g. "5" and "m". In another example, direction of the bicycle i.e. left may be drawn on the chest portion as four letters l, e, f and t="left", to inform the user 110 that the bicycle is located on his left hand side in the surroundings.

The noise generated by the airstream of the one or more nozzles 140 when the portable electronic haptic vision device 100 is attached to the t-shirt 170 of the user 110 is less as compared to the noise generated by the airstream of the one or more nozzles 140 when the portable electronic haptic vision device 100 is attached to, or worn on the head 120 of the user 110. In such an embodiment, the portable electronic haptic vision device 100 is at a distance from the head and ears of the user. Therefore, noise generated by the airstream of the one or more nozzles 140 does not interfere with the user's hearing. In an alternate embodiment, requirement of the sensors 150 to track movement of the user 110 is eliminated, as the 3D capturing device 180 captures information of the visual objects on a real time basis and provides distance, location, and coordinates of the visual objects. In such an embodiment, when the user 110 moves from one location to another location, the 3D capturing device 180 captures information of the visual objects around the current location of the user 110 and provides distance, location, and coordinates of the visual objects. As such, the 3D capturing device 180 and the interpreted information 190 derived therefrom aptly provides a practical and required guidance to the user 110.

Any features of embodiment 11 may be readily combined or permuted with any of the other embodiments 10, 20, 30, 40, 50, 60, 70, 80, 90, 91, 92, 93, 94 and/or 95 in accordance with the invention.

Figure 2:
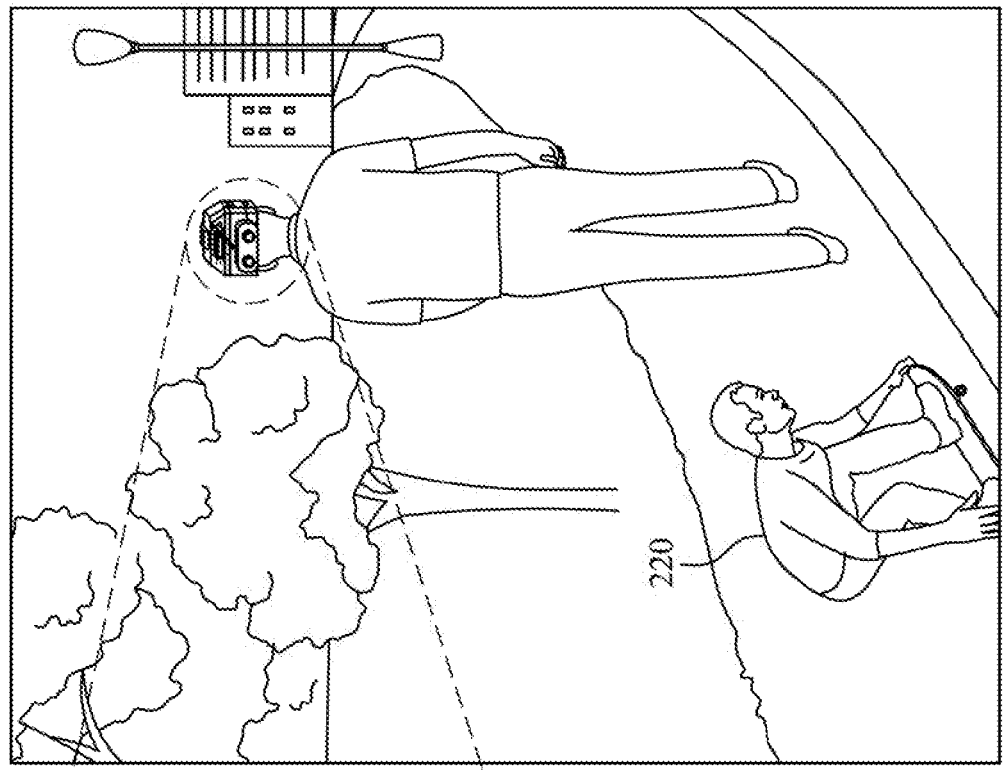
FIG. 2 demonstrates an embodiment 20 of the portable electronic haptic vision device, in accordance with the invention as a block diagram.
Figure 2:
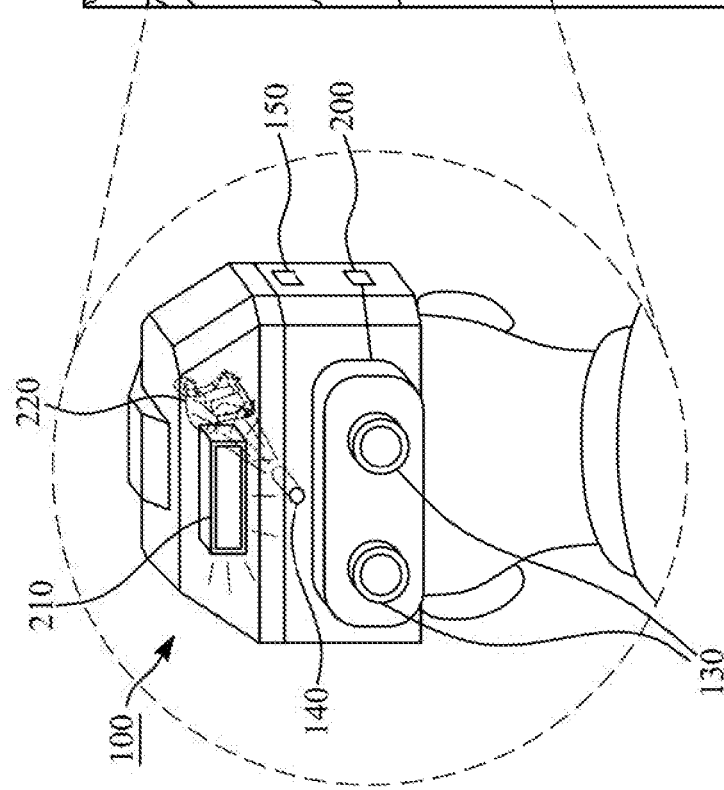

FIG. 2 demonstrates an embodiment 20 of the portable electronic haptic vision device 100. The information about the visual objects in the surroundings is captured by the digital camera 130 and/or the 3D capturing device 180 with a 360 degree field of view of the user 110. The digital camera 130 and/or the 3D capturing device 180 may be located on the back portion of the portable electronic haptic vision device 100 that is capable of capturing images on the backside of the user 110. Further, the image capturing module 130 and/or the 3D capturing device 180 captures all of the spatial surroundings, for example within 10 meters, around the user 110. In an example, the visual object in the surroundings with a 360 degree field of view of the user 110 may be a person skating behind the user 110. The image of the person skating behind the user 110 is captured by the digital camera 130 and/or the 3D capturing device 180. It may be appreciated by a person skilled in the art that any other visual object such as a car, a bike, and/or a bicycle surrounding the user 110 may be captured by the digital camera 130 and/or the 3D capturing device 180. Based on the captured image, an interpreted image 220 of the surroundings is created. The interpreted image 220 is transmitted through the user's sensory to the brain by "drawing" on the skin of the user 110 with one or more air nozzles 140. In an example, predetermined symbols and/or patterns corresponding to interpreted image 220 may be drawn on the skin of the forehead of the user 110 with one or more air nozzles 140.

The portable electronic haptic vision device 100 includes a video signal processing unit 200. The video signal processing unit 200 receives and processes signals received from one of the digital camera 130, a thermal camera, a 3D camera or a video signal from another device, such as a television, a computer or a mobile telephone. In an example, when the user 110 is conversing with another user (not shown), the video signal processing unit 200 attached to the portable electronic haptic vision device 100 may receive signals from the digital camera 130 and/or the 3D capturing device 180 and/or any other device that observes and/or captures the look, joy, sorrow, disappointment, laughter, etc.

In another example, the video signal processing unit 200 may receive signals from the digital camera 130 and/or the 3D capturing device 180 and/or any other device that is capable of capturing image and/or video of the routes, such as sidewalks, street, stairs, corridor, furniture, walls and obstacles along the way, or walkers etc. In yet another example, the video signal processing unit 200 may receive signals from the digital camera 130 and/or the 3D capturing device 180 and/or any other device that can capture an image and/or video on the screen in the surroundings of the user 110, for example, an image and/or video of a movie or a computer game. Based on the captured image and/or video, the interpreted image 220 of the surroundings is created. The interpreted image 220 is transmitted through the user's sensory to the brain by "drawing" on the skin of the user 110 with one or more air nozzles 140. In an example, predetermined symbols and/or patterns corresponding to interpreted image 220 may be drawn on the skin of the forehead of the user 110 with one or more air nozzles 140. In alternate embodiment, the one or more nozzles 140 may be replaced with a straw, a pipe and/or funnel for directing the pressurized air to the forehead of the user 110. In some embodiments coded haptic symbols are transmitted to the skin, and the coded haptic symbols are produced by airstream at the nozzle.

The portable electronic haptic vision device 100 further includes a lighting unit 210. The lighting unit 210 is adapted to illuminate the surroundings of the user 110. In an example, the lighting unit 210 may include one or more lights located at different positions on the portable electronic haptic vision device 100. In one example, the lighting unit 210 may include a light located on the front portion of the portable electronic haptic vision device 100. In another example, the lighting unit 210 may include a light located on the back portion of the portable electronic haptic vision device 100. The lighting unit 210 includes a low power light such as LED, narrow emission band LED, infrared light and/or a flash. In an example, the portable electronic haptic vision device 100 may include the controller to control and/or operate the video signal processing unit 200 and the lighting unit 210. In some embodiments an infrared camera is used to replace the lighting unit 210.

Any features of embodiment 20 may be readily combined or permuted with any of the other embodiments 10, 11, 30, 40, 50, 60, 70, 80, 90, 91, 92, 93, 94 and/or 95 in accordance with the invention.

Figure 3:
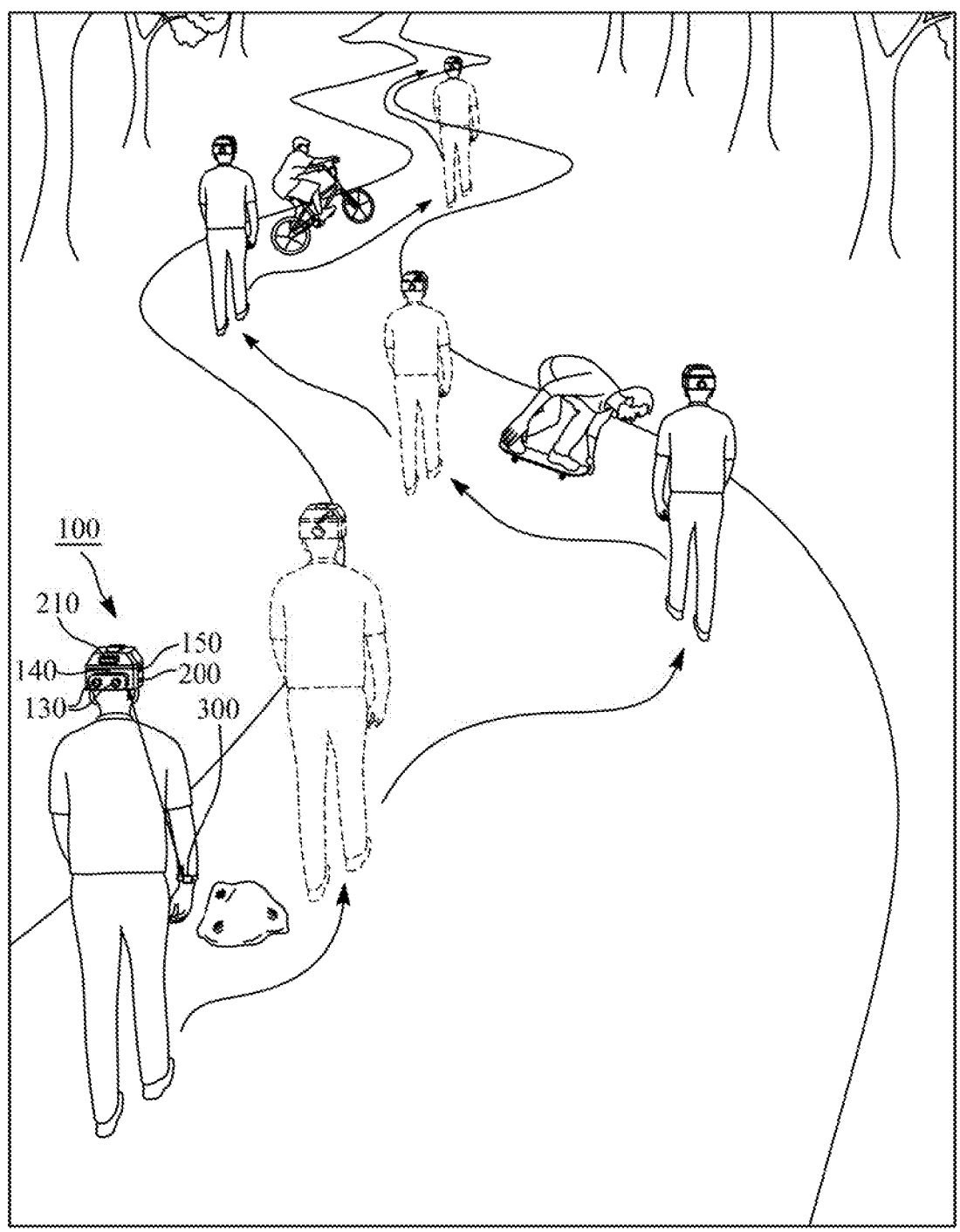
FIG. 3 demonstrates an embodiment 30 of the portable electronic haptic vision device, in accordance with the invention as a block diagram.

FIG. 3 demonstrates an embodiment 30 of the portable electronic haptic vision device 100 embodied as a helmet. Although, the portable electronic haptic vision device 100 is embodied as the helmet, it may be appreciated by a person skilled in the art that the portable electronic haptic vision device 100 may be embodied as a hat, a cap and/or a head protector configured to be attached to user 110, or as a t-shirt, pants, shoes, belt, or the like worn by the user 110. The portable electronic haptic vision device 100 includes at least two digital cameras in the position of the eyes of the user 110. This is a natural position for having the cameras for many people who have had vision in the past, but have lost it during their lifetime. As mentioned earlier, the digital camera 130 and/or the 3D capturing device 180 is used to capture information about visual objects in the surroundings of the user 110. As the user 110 begins to walk in the path, the digital camera 130 and/or the 3D capturing device 180 captures the visual objects around the user 110. Any visual object in the form of an obstacle is captured and the user 110 is notified about the obstacle, such that the user 110 avoids the obstacle and navigates through the path.

When the digital camera 130 and/or the 3D capturing device 180 photographs and/or detects the obstacle to be on the left hand side of the user 110, the digital camera 130 and/or the 3D capturing device 180 captures the image and/or data. Based on the captured image, an interpreted image or data of the captured image or data is created.

The interpreted image or data is transmitted through the user's sensory to the brain by "drawing" on the skin of the user 110 with one or more air nozzles 140. In an example, predetermined symbols and/or patterns corresponding to interpreted image or data may be drawn on the left portion of the forehead of the user 110 with one or more air nozzles 140, thereby indicating the user 110 to move to the right. For example an arrow may be drawn on the forehead of the user, indicating a direction to which the user should move.

In another example, when the digital camera 130 and/or the 3D capturing device 180 photographs and/or detects the obstacle to be on the right hand side of the user 110, the digital camera 130 and/or the 3D capturing device 180 captures the image and/or data of the obstacle. Based on the captured image or data, an interpreted image or data of the object is created. The interpreted image is transmitted through the user's sensory to the brain by "drawing" on the skin of the user 110 with one or more air nozzles 140. In an example, predetermined symbols and/or patterns corresponding to interpreted image or data of the skateboarder may be drawn on the right portion of the forehead of the user 110 with one or more air nozzles 140, thereby indicating the user 110 to move to the left.

In addition, the portable electronic haptic vision device 100 is connected to a peripheral device 300 on the same user 110 providing haptic feedback, optionally with pressurised air. In an example, the peripheral device 300 may be a smart device, such as a smart watch and/or a smartphone. In an example, the peripheral device 300 may send signals that may be received by the video signal processing unit 200.

Any features of embodiment 30 may be readily combined or permuted with any of the other embodiments 10, 11, 20, 40, 50, 60, 70, 80, 90, 91, 92, 93, 94 and/or 95 in accordance with the invention.

Figure 4:
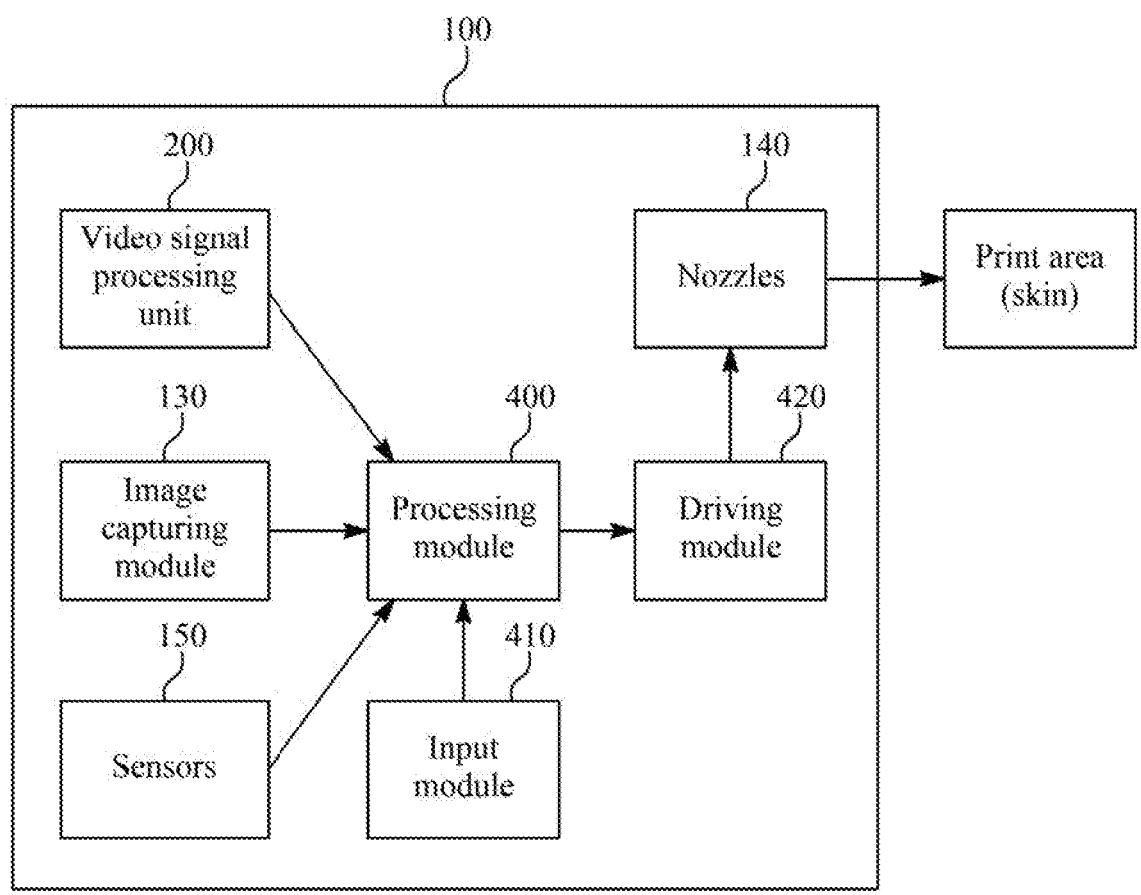
FIG. 4 demonstrates an embodiment 40 of the portable electronic haptic vision device, in accordance with the invention as a block diagram.

FIG. 4 demonstrates an embodiment 40 of the portable electronic haptic vision device 100. In addition to the digital camera 130 and/or the 3D capturing device 180, the one or more nozzles 140, the sensors 150, the video signal processing unit 200, and the lighting unit 210, the portable electronic haptic vision device 100 further includes a processing module 400. The processing module 400 is adapted to process information about visual objects gathered from the digital camera 130 and/or the 3D capturing device 180, information from the sensors 150, and information from the video signal processing unit 200. In an example, the processing module 400 may be in communication with the memory medium of the controller. Owing to the communication between the processing module 400 and the memory medium, the memory medium assists the processing module 400 to analyse and identify the symbols and/or pattern of the interpreted image from the captured image.

The portable electronic haptic vision device 100 further includes an input module 410 to receive an input from the user 110. In an example, the input received by the input module 410 may be via physical controls of the portable electronic haptic vision device 100, or for example by eye tracking of the user. I.e. the user may input some controls by blinking eyes. Further, in an example, the physical controls may be operated by the user 110 to control the movement of the digital camera 130 and/or the 3D capturing device 180. More particularly, the user 110 may use the physical controls or other controls for operating the digital camera 130 and/or the 3D capturing device 180, such as zoom in and zoom out. In addition, the physical controls may be used to adjust the temperature of the pressurised air to be drawn on the forehead of the user 110. In an alternate embodiment, requirement of the user input and the sensors 150 is eliminated, as the 3D capturing device 180 captures information of the detected objects on a real time basis and provides distance, location, and coordinates of the detected objects. In such an embodiment, when the user 110 moves from one location to another location, 20 the 3D capturing device captures information of the visual objects around the current location of the user 110 and provides distance, location, and coordinates of the visual objects. The portable electronic haptic vision device 100 further includes a driving module 420 including at least one pump and valve controller to receive the processed information from the processing module 400. The pump may be muscle powered (for example by rotating a lever) or electronically powered.

The portable electronic haptic vision device typically has a battery and may have also an air tank, so the system can work independently of grid electricity or air supply. The air tank can be filled on a gas station from a bigger air tank, for example, and the battery can be charged with an electronic charger from the grid in some embodiments. These are typically in the driving module 420 in some embodiments. Alternatively, it is also possible that there is no air tank, but the air is sucked from the surroundings and accelerated for streaming on the user 110 by the portable electronic haptic vision device 100.

In particular, the driving module 420 is adapted to receive the symbol and/or pattern of the interpreted image from the processing module 400. Further, based on the video signals received by the video signal processing unit 200 and the image and/or video captured by the digital camera 130 and/or the 3D capturing device 180, interpreted image or data captured from the surroundings is created. The interpreted image or data is transmitted through the user's sensory to the brain by "drawing" on the skin of the user 110 with one or more air nozzles 140. In an example, predetermined symbols and/or patterns corresponding to interpreted image(s) or data may be drawn on the skin of the forehead of the user 110 with one or more air nozzles 140. Further, the portable electronic haptic vision device 100 is capable of measuring the distance of the nozzles 140 to the skin and also measures body temperature of the user 110. Upon measuring the distance of the nozzles 140 to the skin and body temperature of the user 110, the portable electronic haptic vision device 100 adjusts the pressure and temperature of the air to be directed on the skin of the user 110. In an example, when the body temperature of the user 110 is found to be cold, the driving module 420 communicates and/or directs the one or more nozzles 140 to draw the predetermined symbols and/or pattern corresponding to the interpreted image or data using warm compressed air. On the contrary, when the body temperature of the user 110 is found to be warm, the driving module 420 communicates and/or directs the one or more nozzles 140 to draw the predetermined symbols and/or pattern corresponding to the interpreted image or data using cold compressed air. In an example, the portable electronic haptic vision device 100 may include the controller to control and/or operate the processing module 400 and the driving module 420.

In order to convert the image signal to the airstream on the user's skin, Artificial Intelligence (AI) is used to image the objects and the surroundings. Artificial intelligence may be used to select the best symbol set of haptic inputs on the user, and/or Artificial Intelligence may be used to generate new symbol combinations. Using AI, for example usual objects such as human, car, bicycle, building, pedestrian walkway, stairs, chair, table may be identified with a haptic airstream symbol. For example, a sport utility vehicle SUV and a sports car may be identified with the same, or different symbol. If the object cannot be interpreted, the symbol of a generic obstacle is communicated with the haptic airstream to the user. Additionally, the motion of the object and/or the direction of the motion of the object may be communicated with the airstream to the user in some embodiments.

Any features of embodiment 40 may be readily combined or permuted with any of the other embodiments 10, 11, 20, 30, 50, 60, 70, 80, 90, 91, 92, 93, 94 and/or 95 in accordance with the invention.

Figure 5:
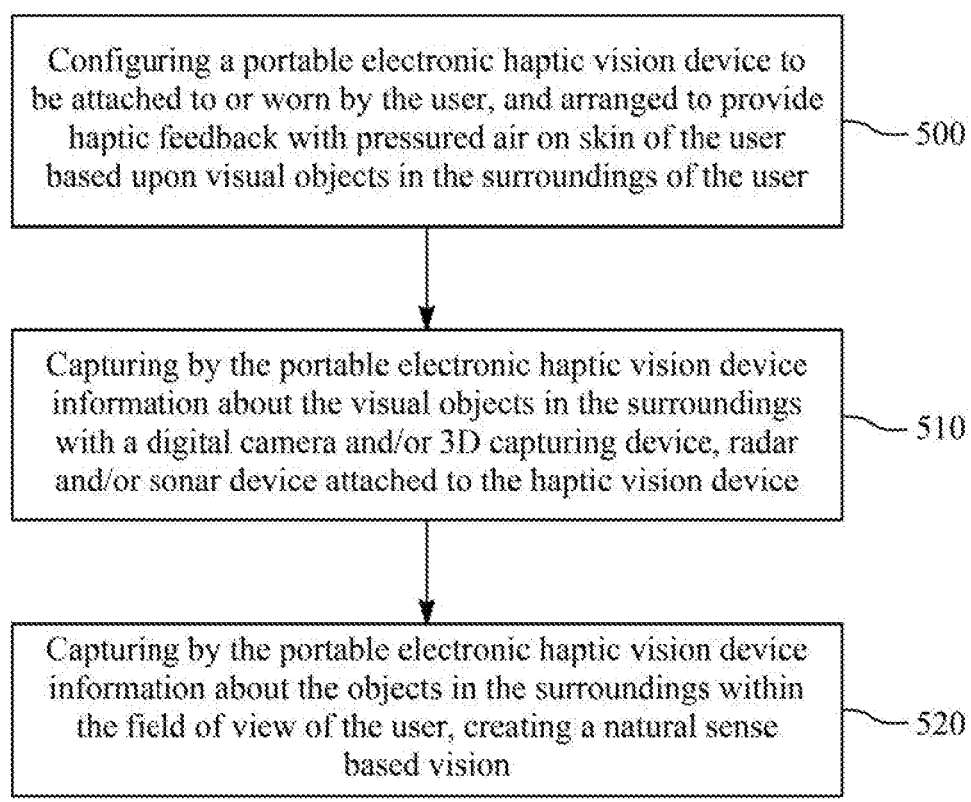
FIG. 5 demonstrates an embodiment 50 of a method for operating the portable electronic haptic vision device, in accordance with the invention as a flow diagram.

FIG. 5 demonstrates an embodiment 50 of a method for operating the portable electronic haptic vision device 100. The method could be implemented in a system identical or similar to embodiments 10, 11, 20, 30, and 40 in FIGS. 1, 1B, 2, 3, and 4 for example, as discussed in the other parts of the description.

In phase 500, the portable electronic haptic vision device 100 is configured to be attached to or worn by the user 110. The portable electronic haptic vision device 100 is arranged to provide haptic feedback with pressurised air on the skin of the user 110 based upon detected objects in the surroundings of the user 110. Also, the skin temperature of the user can be measured and air flow can be adjusted accordingly. Further, the airflow strength and/or volume, can be controlled by the user in some embodiments.

In phase 510, the portable electronic haptic vision device 100 captures information about the objects in the surroundings with the digital camera 130 and/or the 3D capturing device 180, radar and/or sonar device that are attached the portable electronic haptic vision device 100. The portable electronic haptic vision device 100 includes at least two cameras in the position of the eyes of the user 110.

In phase 520, the portable electronic haptic vision device 100 captures information about the visual objects in the surroundings within the field of view of the user 110, creating natural sense based vision.

Any features of embodiment 50 may be readily combined or permuted with any of the other embodiments 10, 11, 20, 30, 40, 60, 70, 80, 90, 91, 92, 93, 94 and/or 95 in accordance with the invention.

Figure 6:
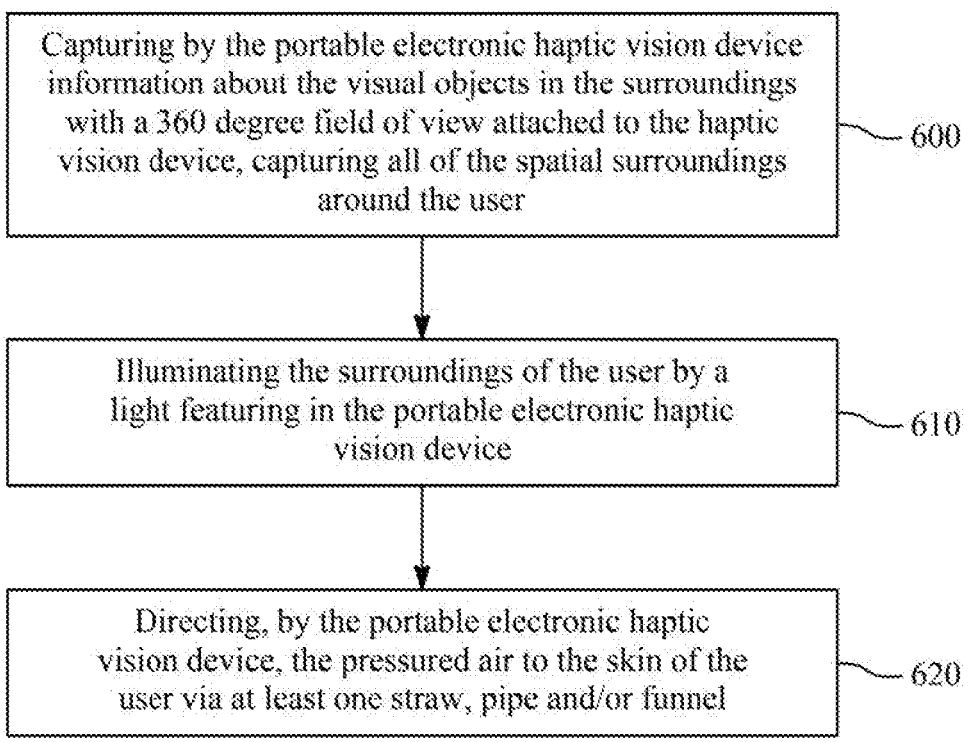
FIG. 6 demonstrates an embodiment 60 of a method for operating the portable electronic haptic vision device, in accordance with the invention as a flow diagram.

FIG. 6 demonstrates an embodiment 60 of the portable electronic haptic vision device 100. The method could be implemented in a system identical or similar to embodiments 10, 11, 20, 30, and/or 40 in FIGS. 1A, 1B, 2, 3, and 4 for example, as discussed in the other parts of the description.

In phase 600, the portable electronic haptic vision device 100 captures information about the objects in the surroundings with a 360 degree field of view of the user 110. The portable electronic haptic vision device 100 is configured to capture all of the spatial surroundings around the user 110. The information about the detected objects in the surroundings with the 360 degree field of view is captured by the digital camera 130 and/or the 3D capturing device 180.

In phase 610, surroundings of the user 110 is illuminated by the lighting unit 210. The lighting unit 210 includes a low power light such as LED, narrow emission band LED, infrared light and/or a flash.

In phase 620, the portable electronic haptic vision device 100 directs the pressurized air to the skin of the user 110 via at least one nozzle 140, a straw, a pipe, and/or funnel.

Any features of embodiment 60 may be readily combined or permuted with any of the other embodiments 10, 11, 20, 30, 40, 50, 70, 80, 90, 91, 92, 93, 94 and/or 95 in accordance with the invention.

Figure 7:
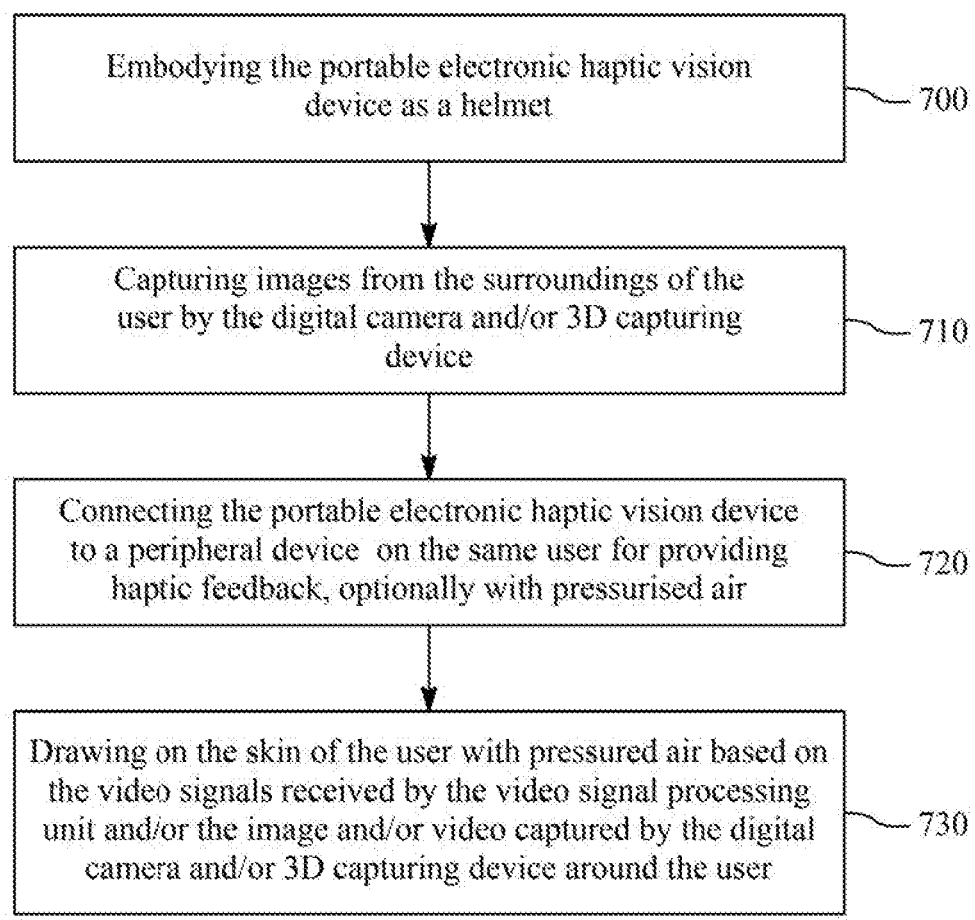
FIG. 7 demonstrates an embodiment 70 of a method for operating the portable electronic haptic vision device, in accordance with the invention as a flow diagram.

FIG. 7 demonstrates an embodiment 70 of the portable electronic haptic vision device 100. The method could be implemented in a system identical or similar to embodiments 10, 11, 20, 30, and 40 in FIGS. 1A, 1B, 2, 3, and 4 for example, as discussed in the other parts of the description.

In phase 700, the portable electronic haptic vision device 100 is embodied as a helmet.

In phase 710, images or data from the surroundings of the user 110 are captured from the digital camera 130 and/or the 3D capturing device 180.

In phase 720, the portable electronic haptic vision device 100 is connected to the peripheral device 300 on the same user 110 providing haptic feedback, optionally with pressurized air.

In phase 730, drawing on the skin of the user 110 with pressurized air any of the following, or a symbol corresponding to any of the following: routes, pedestrian walkways, streets, stairs, corridors, furniture, walls, obstacles, impressions and expressions from another person's face, and/or video signal obtained from a screen, such as a movie or computer game images. Material from video or computer games can be converted to haptic feedback based on the video signals received by the video signal processing unit 200 and/or the image and/or video captured by the digital camera 130 and/or the 3D capturing device 180 around the user 110.

Any features of embodiment 70 may be readily combined or permuted with any of the other embodiments 10, 11, 20, 30, 40, 50, 60, 80, 90, 91, 92, 93, 94 and/or 95 in accordance with the invention.

Figure 8:
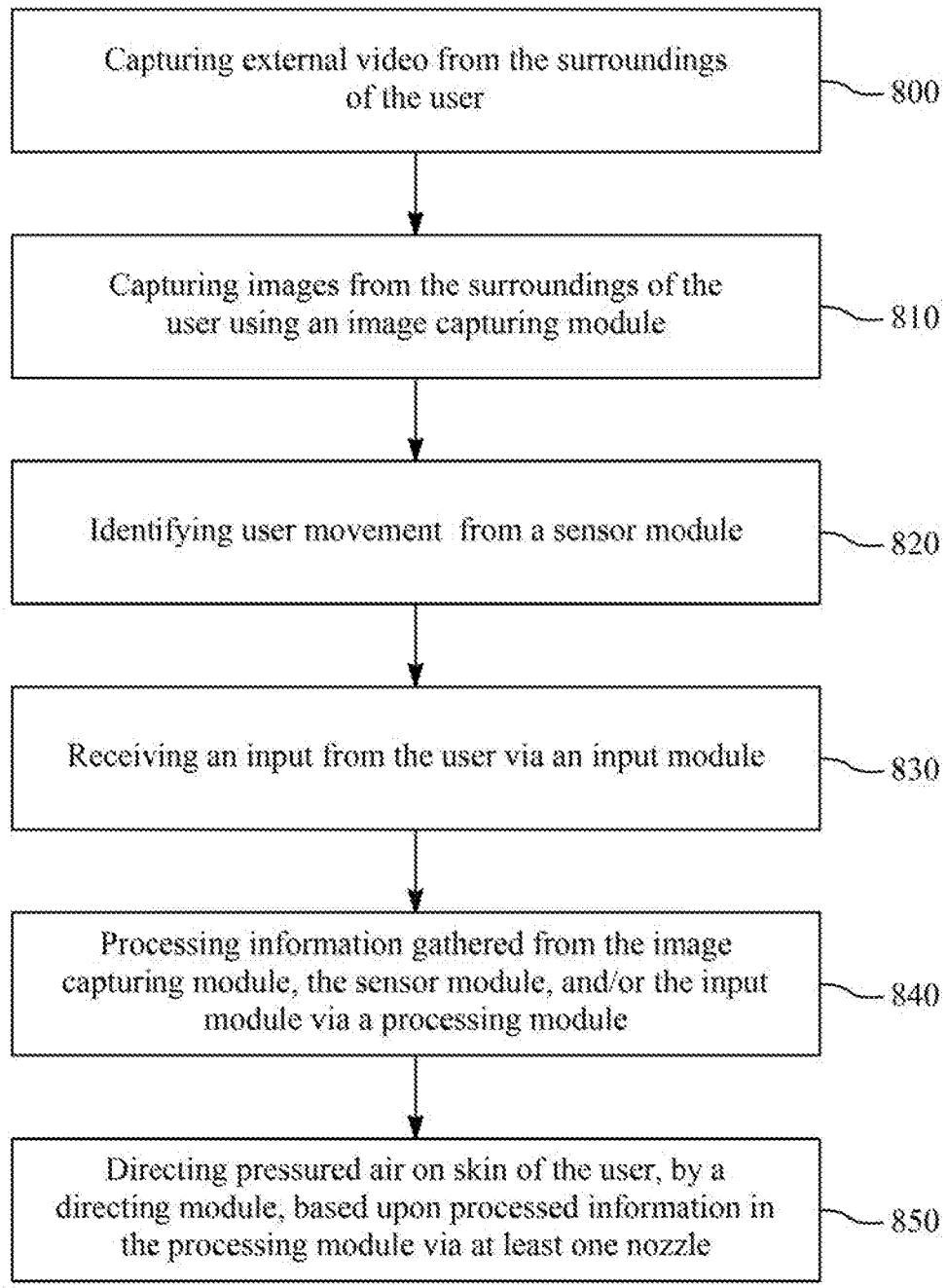
FIG. 8 demonstrates an embodiment 80 of a method for operating the portable electronic haptic vision device, in accordance with the invention as a flow diagram.

FIG. 8 demonstrates an embodiment 80 of the portable electronic haptic vision device 100. The method could be implemented in a system identical or similar to embodiments 10, 11, 20, 30, and 40 in FIGS. 1A, 1B, 2, 3, and 4 for example, as discussed in the other parts of the description.

In phase 800, external video signals from the surroundings of the user 110 are captured by the video signal processing unit 200. The video signal processing unit 200 receives and processes signals received from one of the digital camera 130, a thermal camera, a 3D camera or a video signal from another device, such as a television, a computer or a mobile telephone.

In phase 810, images from the surroundings of the user 110 is captured from the digital camera 130 and/or the 3D capturing device 180. The digital camera 130 and/or the 3D capturing device 180 is used to capture information about visual objects in the surroundings of the user 110.

In phase 820, movements of the user 110 are identified using the sensors 150. The sensors 150 may include the motion sensor to track movement of the user 110 and the eye movement tracking sensor configured to track the eyes of the user 110.

In phase 830, an input from the user 110 is received via the input module 410. In an example, the input received by the input module 410 may be received via physical controls of the portable electronic haptic vision device 100.

In phase 840, information gathered from the image capturing module and/or the 3D capturing device 180, the sensor module 150, and/or the input module 410 is processed with the processing module 400.

In an alternate embodiment, requirement of the user input and the sensors 150 is eliminated, as the 3D capturing device 180 captures information of the visual objects on a real time basis and provides distance, location, and coordinates of the visual objects as a 3D point cloud. In such an embodiment, when the user 110 moves from one location to another location, the 3D capturing device captures information of the visual 10 objects around the current location of the user 110 and provides distance, location, and coordinates of the detected visual objects as a 3D point cloud that is converted to haptic feedback.

In phase 850, pressurized air is directed on skin of the user 110 to provide haptic feedback, based upon processed information in the processing module 400 via the one or more nozzles 140. Based on the video signals received by the video signal processing unit 200 and the image and/or video captured by the digital camera 130 and/or the 3D capturing device 180 around the user 110, the driving module 420 directs the one or more nozzles 140 to draw predetermined symbols and/or patterns corresponding to the 3D point cloud using pressurized air on the skin of the user 110.

Any features of embodiment 80 may be readily combined or permuted with any of the other embodiments 10, 11, 20, 30, 40, 50, 60, 70, 90, 91, 92, 93, 94 and/or 95 in accordance with the invention.

Figure 9:
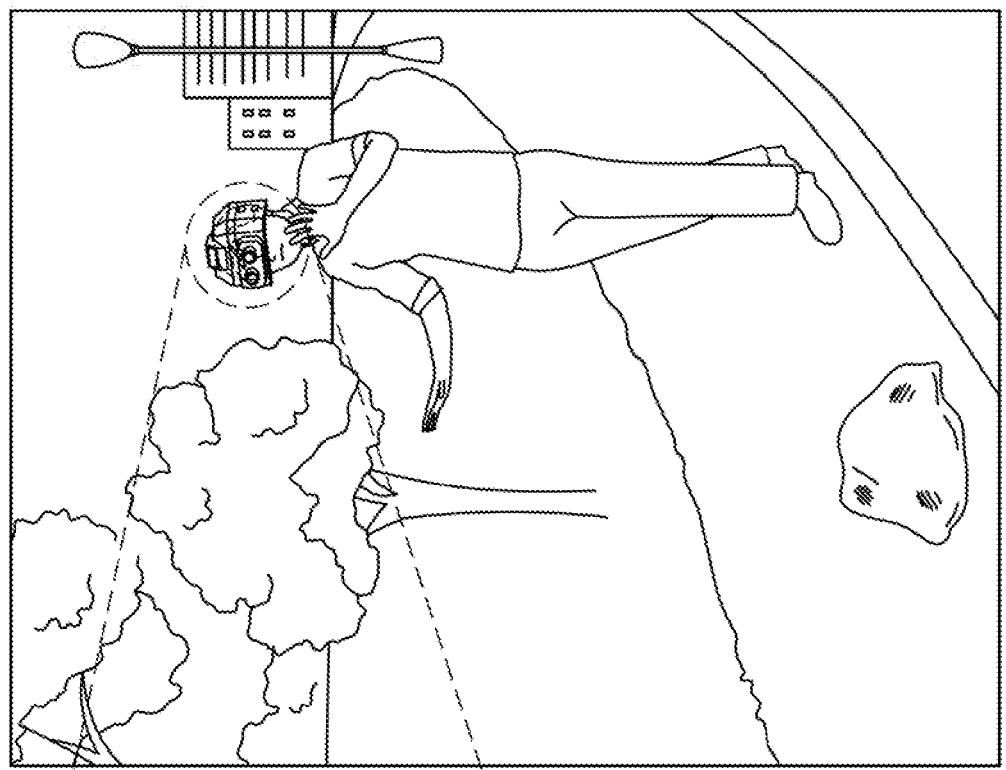
FIG. 9 demonstrates an embodiment 90 of a software program product for the portable electronic haptic vision device 100, in accordance with the invention as a block diagram.
Figure 9:
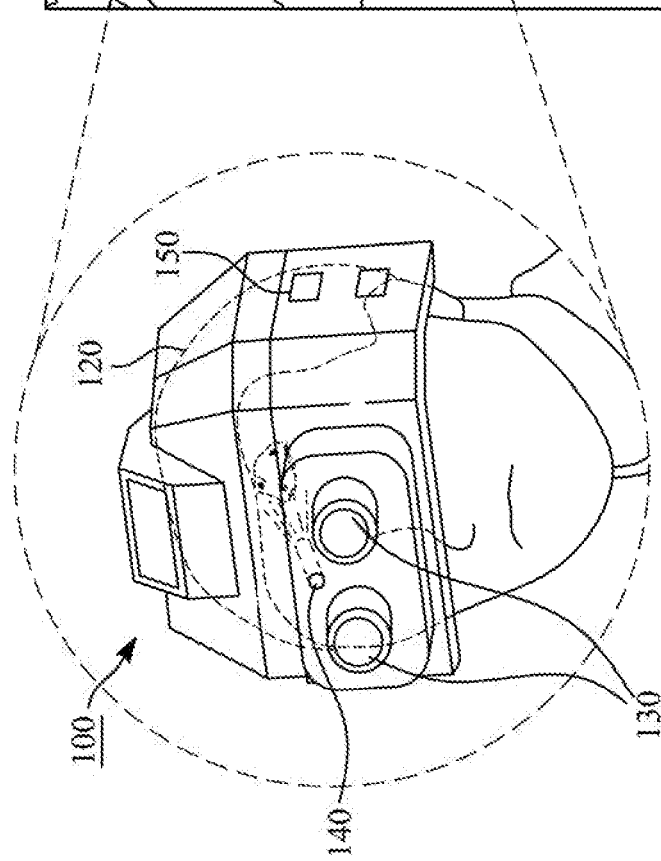

FIG. 9 demonstrates an embodiment 90 of a software program product for the portable electronic haptic vision device 100. The software program product as discussed herein is defined to encompass program instructions, processing hardware, necessary operating systems, device drivers, electronic circuits, the image capturing module 130 and/or the 3D capturing device 180, the sensors 150, the video signal processing unit 200, the lighting unit 210, the peripheral device 300, the processing module 400, the input module 410 and/or the driving module 420 for the operation of the portable electronic haptic vision device 100. The software program product is elaborated below in FIGS. 9, 10, and 11. The software program product operates the portable electronic haptic vision device 100 that is configured to be attached to or worn on the head 120 of the user 110. The portable electronic haptic vision device 100 is arranged to provide haptic feedback with pressurized air on the skin of the user 110 based upon the visual objects in the surroundings of the user 110. The software program product includes the digital camera 130 and/or the 3D capturing device 180 to capture information about the visual objects in the surroundings of the user 110. The information about the visual objects captured using the digital camera 130 and/or the 3D capturing device 180 is recorded as images, video and/or alphanumeric data, for example a 3D point cloud.

In an example, when the user 110 is conversing with another user (not shown), the digital camera 130 and/or the 3D capturing device 180 attached to the portable electronic haptic vision device 100 can be used to observe and/or capture the look, joy, sorrow, disappointment, laughter, etc. from the face of the other person.

In another example, the digital camera 130 and/or the 3D capturing device 180 of the portable electronic haptic vision device 100 is also capable of capturing images of the routes, such as sidewalks, street, stairs, corridor, furniture, walls and obstacles along the way, or walkers etc. and provide haptic feedback to the visually impaired user that allows him to navigate in these surroundings.

In yet another example, the digital camera 130 and/or the 3D capturing device 180 may capture an image on the screen in the surroundings of the user 110, for example, an image of a movie or a computer game and convert it to haptic feedback.

In an example, the information about the visual objects in the surroundings of the user 110 may be captured with a radar and/or sonar device attached to the portable electronic haptic vision device 100 and recorded as video.

As shown in FIG. 9, an exemplary view of a street ahead of the user 110 is illustrated. The image capturing module 130 includes at least two cameras, and one of the at least two cameras is active to capture the image located ahead of the user 110. Based on the captured image and/or video, an interpreted image of the surroundings is created. The interpreted image is transmitted through the user's sensory to the brain by "drawing" on the skin of the user 110, for example, forehead with one or more air nozzles 140. In an example, predetermined symbols and/or patterns corresponding to interpreted image may be drawn on the skin of the forehead of the user 110 with one or more air nozzles 140.

The software program product further includes the sensor module 150. In one embodiment, the sensor module 150 is used to track movement of the user 110. In an example, the activated mode of the sensors 150 may be indicated with a green colour and deactivated mode of the sensors 150 may be indicated with a red colour. The information about the visual objects in the surroundings is captured, by the active camera of the image capturing module 130 and/or the 3D capturing device 180, within the field of view of the user 110. In an alternate embodiment, requirement of the user input and the sensors 150 is eliminated, as the 3D capturing device 180 captures information of the visual objects on a real time basis and provides distance, location, and coordinates of the visual objects. In such an embodiment, when the user 110 moves from one location to another location, the 3D capturing device captures information of the visual objects around the current location of the user 110 and provides distance, location, and coordinates of the visual objects.

Any features of embodiment 90 may be readily combined or permuted with any of the other embodiments 10, 11, 20, 30, 40, 50, 60, 70, 80, 91, 92, 93, 94 and/or 95 in accordance with the invention.

Figure 10:
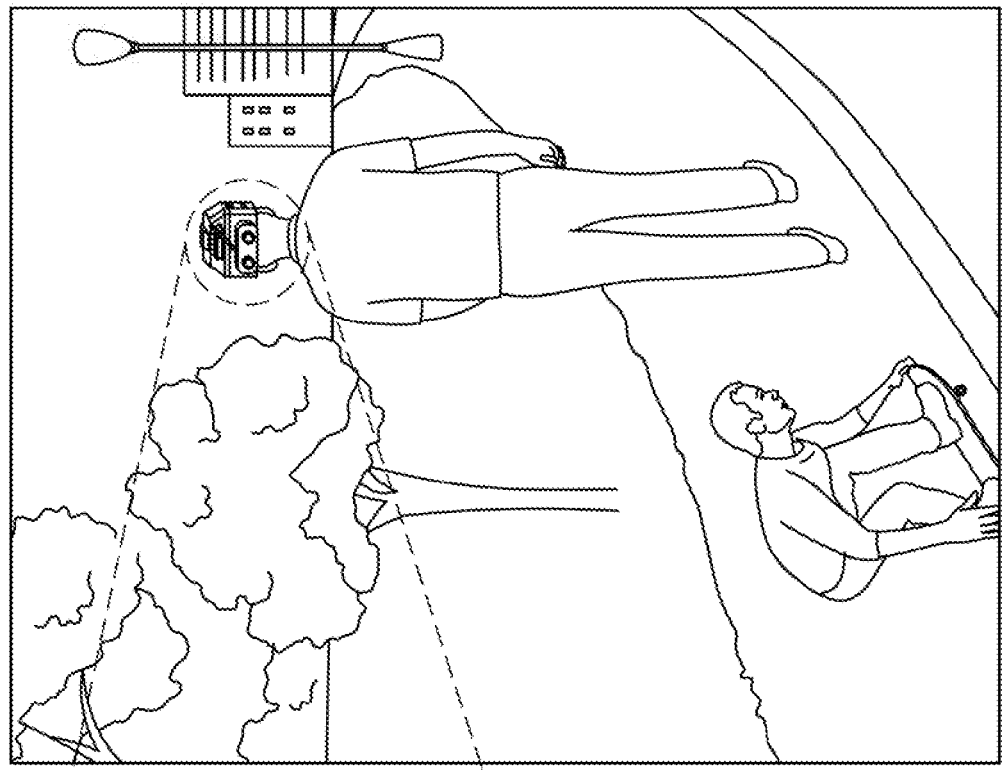
FIG. 10 demonstrates an embodiment 91 of a software program product for the portable electronic haptic vision device 100, in accordance with the invention as a screen shot diagram.
Figure 10:
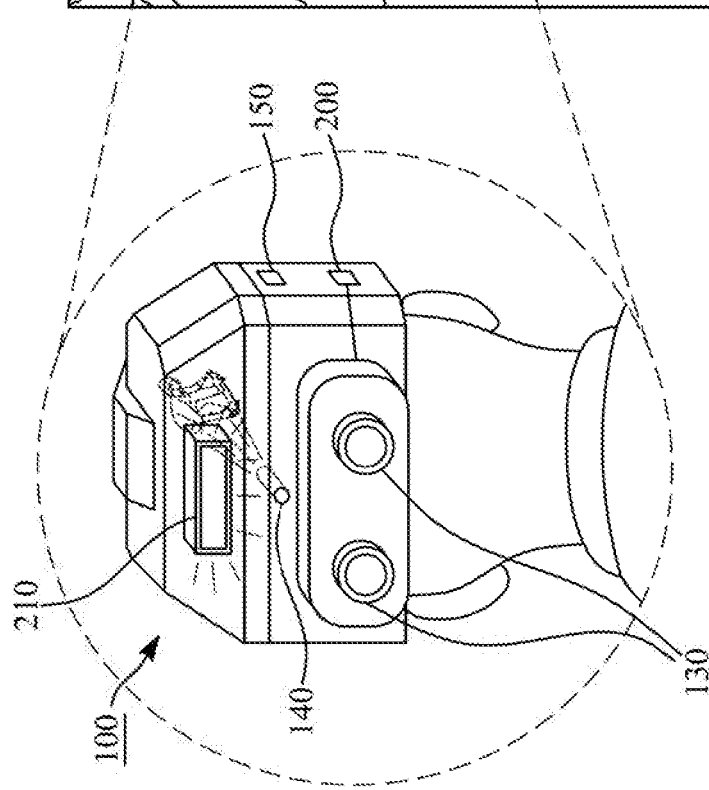

FIG. 10 demonstrates an embodiment 91 of a software program product for the portable electronic haptic vision device 100. The software program product further includes the video signal processing unit 200. The information about the visual objects in the surroundings with a 360 degree field of view is captured by the digital camera 130 and/or the 3D capturing device 180 that is attached to the portable electronic haptic vision device 100. As shown in FIG. 10, an exemplary view of the street behind the user 110 is illustrated. The video signal processing unit 200 is activated and processes signals received from one of the digital camera 130, a thermal camera, a 3D camera, or a video signal from another device, such as a television, a computer or a mobile telephone.

In an example, the video signal processing unit 200 may receive signals from the digital camera 130 and/or the 3D capturing device 180 and/or any other device that can capture an image and/or video on the screen in the surroundings of the user 110, for example, an image and/or video of a computer game. Based on the captured image and/or video, an interpreted image of the surroundings is created. The interpreted image is transmitted through the user's sensory to the brain by "drawing" on the skin of the user 110, for example, forehead with one or more air nozzles 140. In an example, predetermined symbols and/or patterns corresponding to interpreted image may be drawn on the skin of the forehead of the user 110 with one or more air nozzles 140. The portable electronic haptic vision device 100 further includes the lighting unit 210 to illuminate the surroundings of the user 110. As shown, the lighting unit is activated and illuminates light to notify and/or alert the user 110 about the surroundings.

Any features of embodiment 91 may be readily combined or permuted with any of the other embodiments 10, 11, 20, 30, 40, 50, 60, 70, 80, 90, 92, 93, 94 and/or 95 in accordance with the invention.

Figure 11:
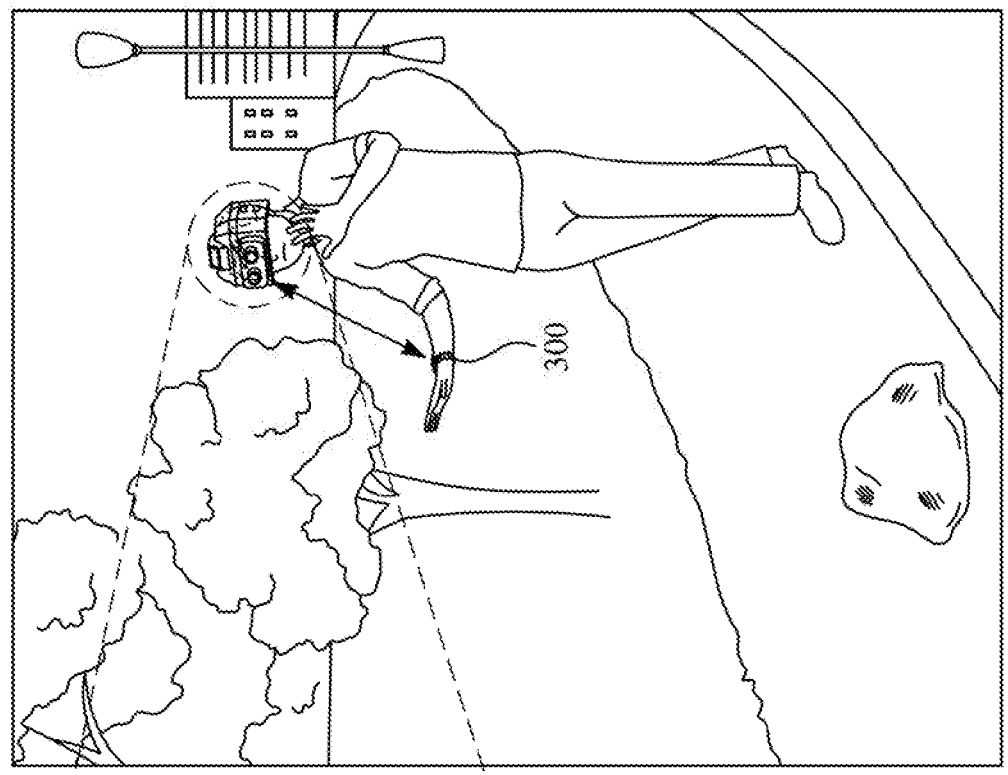
FIG. 11 demonstrates an embodiment 92 of a software program product for the portable electronic haptic vision device 100, in accordance with the invention as a screen shot diagram.
Figure 11:
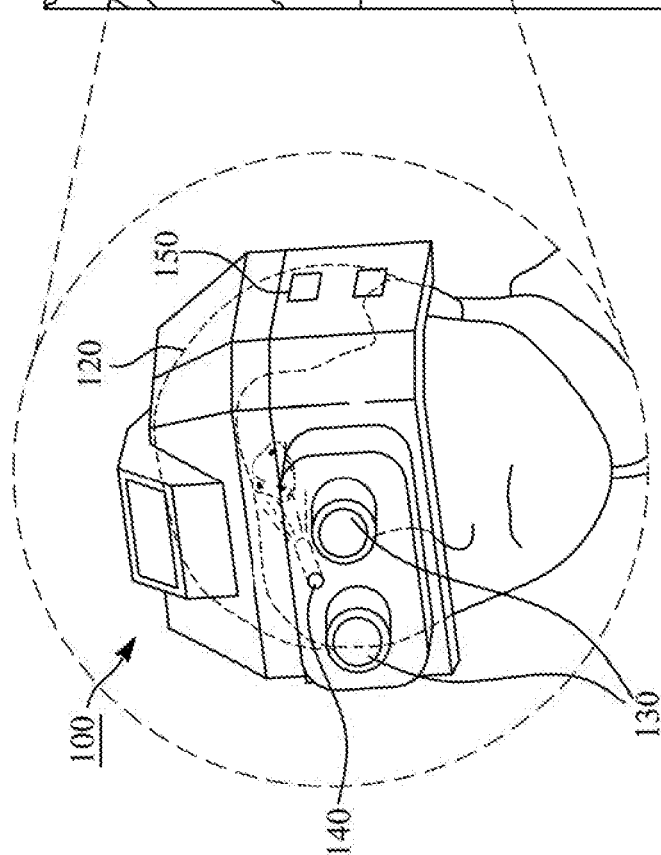

FIG. 11 demonstrates an embodiment 92 of a software program product for the portable electronic haptic vision device 100. The portable electronic haptic vision device 100 includes at least two digital cameras in the position of the eyes of the user 110. As mentioned earlier, the digital camera 130 and/or the 3D capturing device 180 is used to capture information about visual objects in the surroundings of the user 110. In addition, the portable electronic haptic vision device 100 is connected to the peripheral device 300 on the same user 110 providing haptic feedback, optionally with pressurised air. In an example, the peripheral device 300 may be a smart device, such as a smart watch and/or a smartphone. Further, the peripheral device 300 may be physically or wirelessly connected to the portable electronic haptic vision device 100 for providing haptic feedback to the user 110.

Any features of embodiment 91 may be readily combined or permuted with any of the other embodiments 10, 11, 20, 30, 40, 50, 60, 70, 80, 90, 91, 93, 94 and/or 95 in accordance with the invention.

Figure 12:
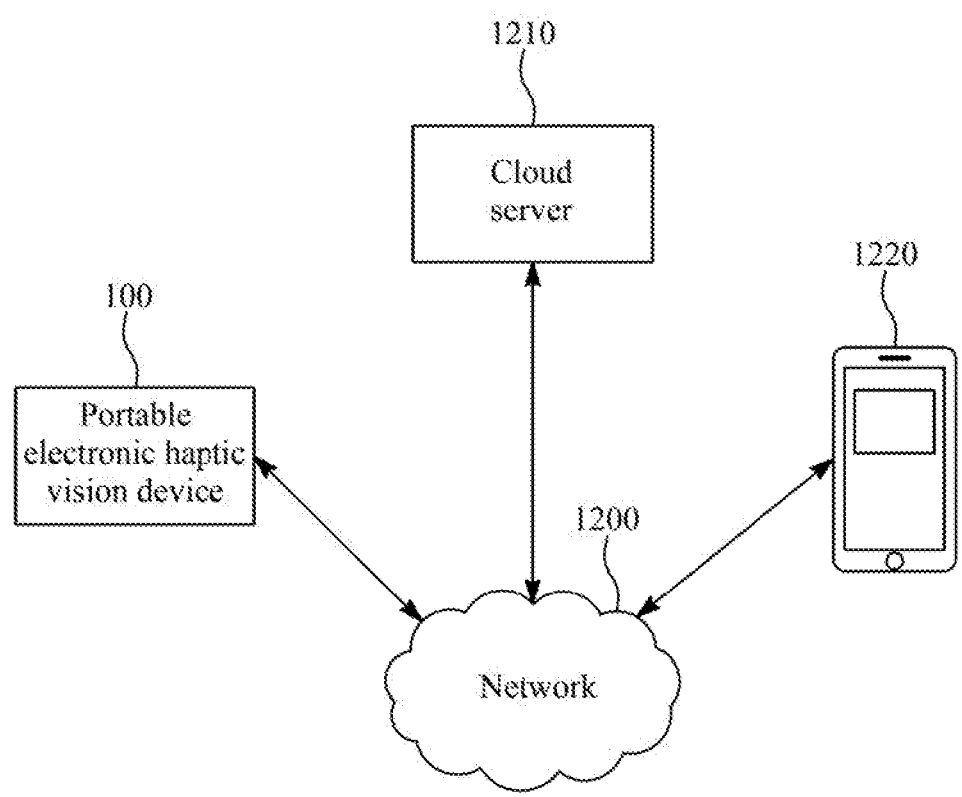
FIG. 12 demonstrates an embodiment 93 of a software program product for the portable electronic haptic vision device 100, in accordance with the invention as a block diagram.

FIG. 12 demonstrates an embodiment 93 of a software program product. The portable electronic haptic vision device 100 is connected to the peripheral device 300 on the same user 110 providing haptic feedback, optionally with pressurised air. In an example, the peripheral device 300 may be a smart device, such as a smart watch and/or a smartphone. The portable electronic haptic vision device 100 is in communication with a network 1200, a cloud server 1210, and a peripheral device 1220. The portable electronic haptic vision device 100 and the peripheral device 1220 communicate with the cloud server 1210 via the network 1200. The network 1200 used for the communication in the invention is the wireless or wireline Internet or the telephony network, which is typically a cellular network such as UMTS (Universal Mobile Telecommunication System), GSM (Global System for Mobile Telecommunications), GPRS (General Packet Radio Service), CDMA (Code Division Multiple Access), 3G, 4G, Wi-Fi and/or WCDMA (Wideband Code Division Multiple Access)-network.

The peripheral device 1220 is in communication with the network 1200 and the cloud server 1210. The peripheral device 1220 may be configured as a mobile terminal computer, typically a smartphone and/or a tablet that is used to receive identification information pertaining to the user. The peripheral device 1220 is typically a mobile smartphone, such as iOS, Android or a Windows Phone smartphone. However, it is also possible that the peripheral device 1220 is a mobile station, mobile phone or a computer, such as a PC-computer, Apple Macintosh computer, PDA device (Personal Digital Assistant), or UMTS (Universal Mobile Telecommunication System), GSM (Global System for Mobile Telecommunications), WAP (Wireless Application Protocol), Teldesic, Inmarsat-, Iridium-, GPRS—(General Packet Radio Service), CDMA (Code Division Multiple Access), GPS (Global Positioning System), 3G, 4G, Bluetooth, WLAN (Wireless Local Area Network), Wi-Fi and/or WCDMA (Wideband Code Division Multiple Access) compliant mobile station. Sometimes in some embodiments the peripheral device 1220 is a device that has an operating system such as any of the following: Microsoft Windows, Windows NT, Windows CE, Windows Pocket PC, Windows Mobile, GEOS, Palm OS, Meego, Mac OS, iOS, Linux, BlackBerry OS, Google Android and/or Symbian or any other computer or smart phone operating system.

The peripheral device 1220 provides an application (not shown) to allow the user to input identification information pertaining to the user to be authenticated with the cloud server 1210 to enable controlling and/or operating of the portable electronic haptic vision device 100. Preferably the user downloads the application from the Internet, or from various app stores that are available from Google, Apple, Facebook and/or Microsoft. For example, in some embodiments an iPhone user with a Facebook application on his phone will download the application that is compatible with both the Apple and Facebook developer requirements. Similarly, a customized application can be produced for other different handsets.

In an example, the cloud server 1210 may comprise a plurality of servers. In an example implementation, the cloud server 1210 may be any type of a database server, a file server, a web server, an application server, etc., configured to store identification information related to the user. In another example implementation, the cloud server 1210 may comprise a plurality of databases for storing the data files. The databases may be, for example, a structured query language (SQL) database, a NoSQL database such as the Microsoft® SQL Server, the Oracle® servers, the MySQL® database, etc. The cloud server 1210 may be deployed in a cloud environment managed by a cloud storage service provider, and the databases may be configured as cloud-based databases implemented in the cloud environment.

The cloud server 1210 which may include an input-output device usually comprises a monitor (display), a keyboard, a mouse and/or touch screen. However, typically there is more than one computer server in use at one time, so some computers may only incorporate the computer itself, and no screen and no keyboard. These types of computers are typically stored in server farms, which are used to realise the cloud network used by the cloud server 1210 of the invention. The cloud server 1210 can be purchased as a separate solution from known vendors such as Microsoft and Amazon and HP (Hewlett-Packard). The cloud server 1210 typically runs Unix, Microsoft, iOS, Linux or any other known operating system, and comprises typically a microprocessor, memory, and data storage means, such as SSD flash or Hard drives. To improve the responsiveness of the cloud architecture, the data is preferentially stored, either wholly 10 or partly, on SSD i.e. Flash storage. This component is either selected/configured from an existing cloud provider such as Microsoft or Amazon, or the existing cloud network operator such as Microsoft or Amazon is configured to store all data to a Flash based cloud storage operator, such as Pure Storage, EMC, Nimble storage or the like.

In order to convert the image signal to the airstream on the user's skin, Artificial Intelligence (AI) is used to recognise the objects in the surroundings. Deep learning files can be updated to the portable electronic haptic device from the cloud server.

Any features of embodiment 93 may be readily combined or permuted with any of the other embodiments 10, 11, 20, 30, 40, 50, 60, 70, 80, 90, 91, 92, 94 and/or 95 in accordance with the invention.

Figure 13:
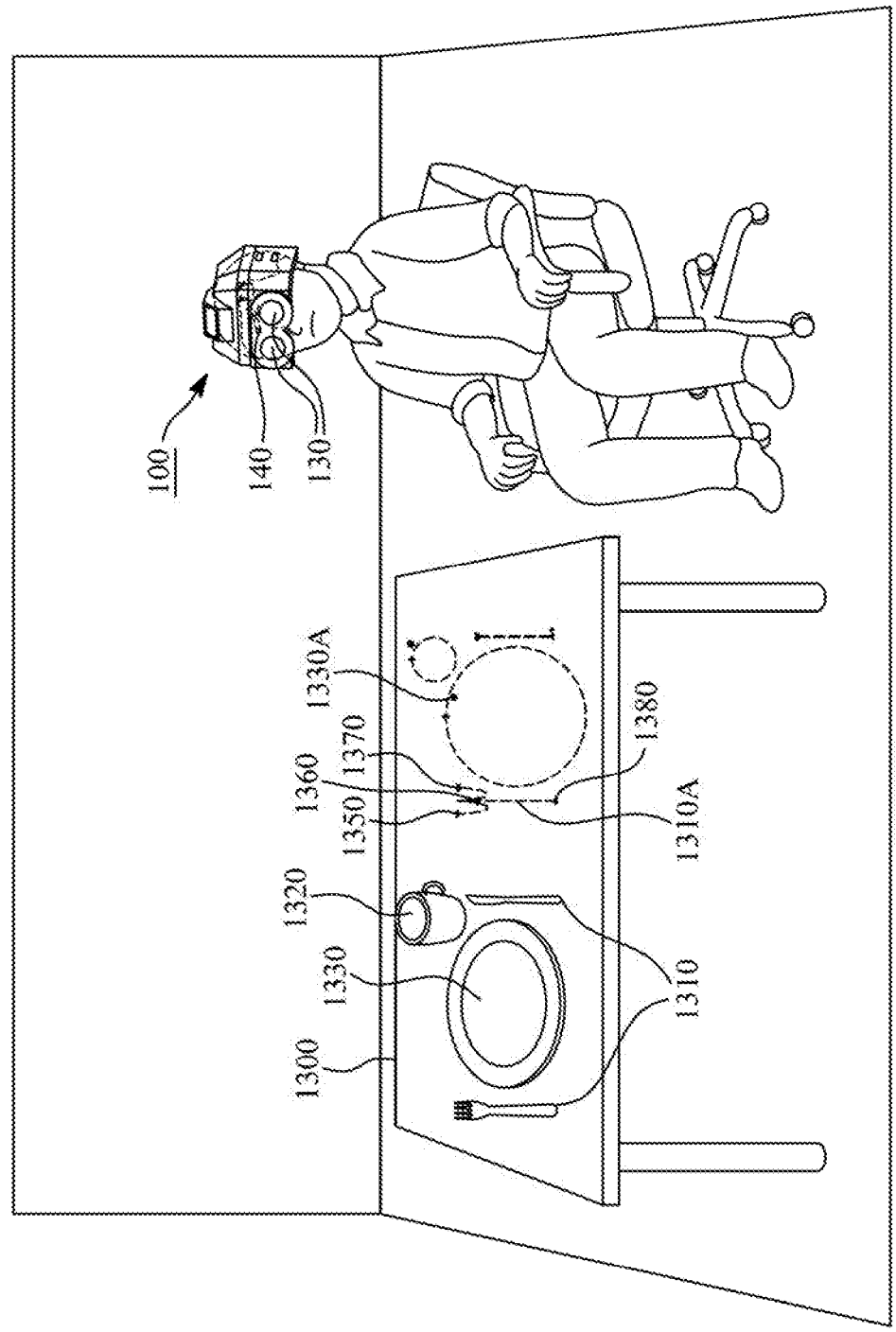
FIG. 13 demonstrates an embodiment 94 of the portable electronic haptic vision device 100, in accordance with the invention as a block diagram.

FIG. 13 demonstrates an embodiment 94 of the portable electronic haptic vision device 100. An exemplary view of an instance when the user 110 is near a dining table 1300 is illustrated. The digital camera 130 and/or the 3D capturing device 180 of the portable electronic haptic vision device 100 captures information about the visual objects on the dining table 1300, where the visual objects may be at least one of the following: cutlery 1310, a glass 1320, or a plate 1330. The captured image about the visual objects is communicated to the processing module 400 for processing, and identifying the objects in the processed image by comparing with images stored in the memory medium of the controller. Based on the objects identified in the processed image, an interpreted image of each object on the dining table 1300 is created. The 3D capturing device 180, which may be a scanner, may also recognise the cutlery items as a 3d point cloud as explained before.

Subsequently, information pertaining to the interpreted images, such as shape of the object, type of the object, and size of the object, is communicated to the driving module 420 for conversion to haptic feedback. Similarly a 3D-point cloud may be converted to corresponding haptic feedback.

For the purpose of drawing the haptic feedback on the forehead of the user 110, the controller is configured to create nodes at ends/corners/periphery of each interpreted object to draw the corresponding haptic feedback on the skin of the user 110 with one or more air nozzles 140. In an example, when the identified object is plate 1330, interpreted image 1330A of the plate 1330 is created. Based on the shape and size of the interpreted image 1330A, the controller creates node 1340 indicative of start and end point for blowing and terminating flow of pressurised air, respectively. In another example, when the identified object is a fork, interpreted image 1310A of the fork is created. Based on the shape and size of the interpreted image 1310A, the controller creates nodes 1350, 1360, 1370, and 1380 indicative of start and end points for blowing and terminating flow of pressurised air, respectively. Thereby pictures of the plate 1330A or fork 1310A can be drawn on the skin of the user.

Further, in some embodiments the controller is configured to develop, and may draw, a representative symbol and/or pattern corresponding to an object to the skin of the user 110. Development of representative symbols is useful when the detected objects are complex in design.

Any features of embodiment 94 may be readily combined or permuted with any of the other embodiments 10, 11, 20, 30, 40, 50, 60, 70, 80, 90, 91, 92, 93 and/or 95 in accordance with the invention.

Figure 14:
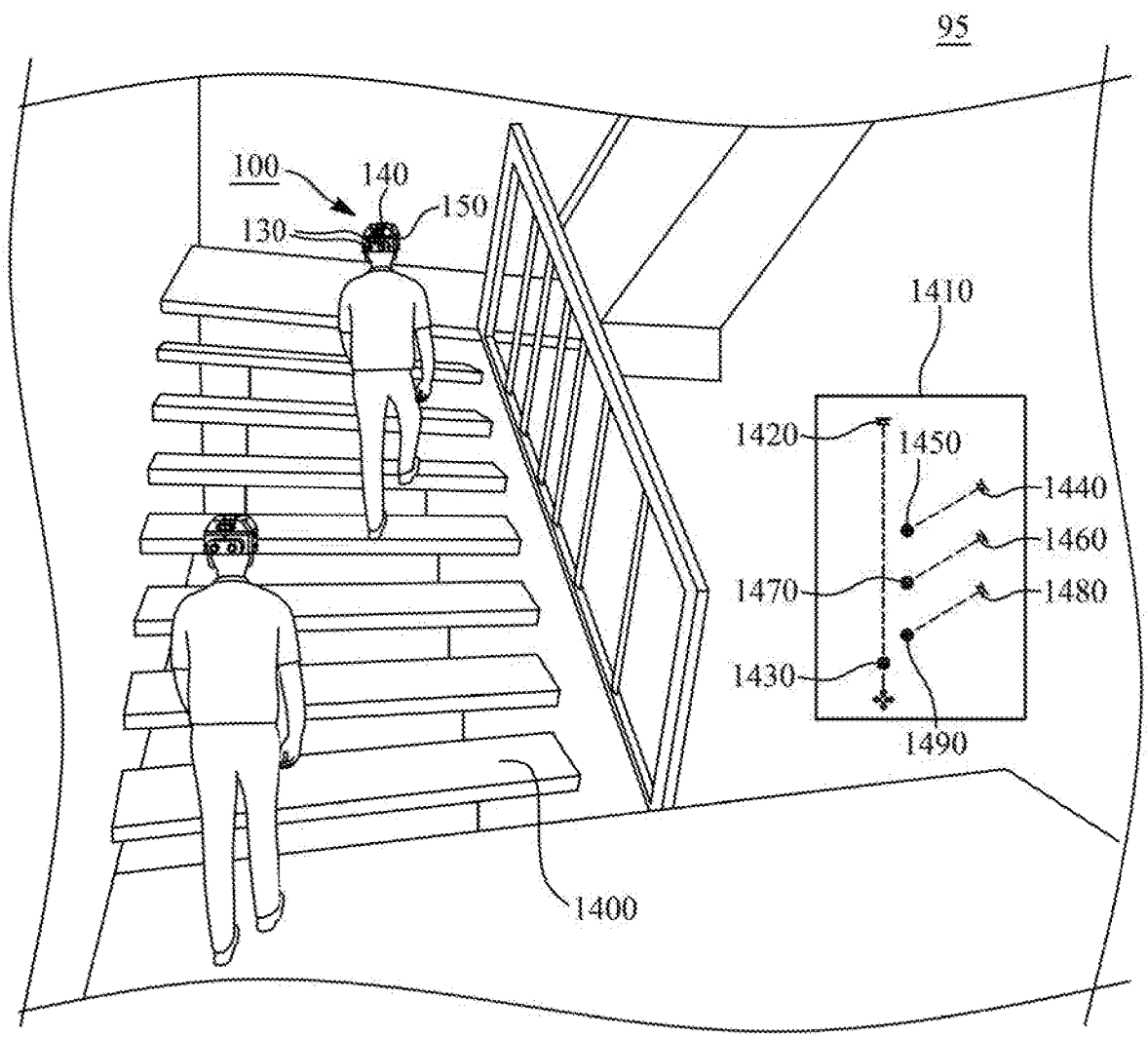
FIG. 14 demonstrates an embodiment 95 of the portable electronic haptic vision device 100, in accordance with the invention as a block diagram.

FIG. 14 demonstrates an embodiment 95 of the portable electronic haptic vision device 100. An exemplary view of an instance when the user 110 approaching a staircase 1400 is illustrated. The digital camera 130 and/or the 3D capturing device 180 of the portable electronic haptic vision device 100 captures the image of the staircase 1400. The captured image is communicated to the processing module 400 for comparing with images stored in the memory medium of the controller. Based on the objects identified in the processed image, an interpreted image 1410 of the staircase 1400 is created. For the purpose of drawing the interpreted image 1410, the controller is configured to create nodes at ends/corners/periphery of the interpreted image 1410 to draw the interpreted image 1410 on the skin of the user 110 with one or more air nozzles 140. Based on the shape and size of the interpreted image 1410, the controller creates node 1420, 1430, 1440, 1450, 1460, 1470, 1480, and 1490 indicative of start and end point for blowing and terminating flow of pressurised air, respectively.

Any features of embodiment 95 may be readily combined or permuted with any of the other embodiments 10, 11, 20, 30, 40, 50, 60, 70, 80, 90, 91, 92, 93 and/or 94 in accordance with the invention.

The invention has been explained in the aforementioned and sizable advantages of the invention have been demonstrated. The invention results in a portable electronic haptic vision device that is configured to be attached worn by the user. The portable electronic haptic vision device is arranged to provide haptic feedback with pressurized air on skin of the user based upon detected objects in the surroundings of the user. The portable electronic haptic vision device eliminates requirement of contact with the skin of the user. The invention draws contents of the captured image, video and/or 3D point cloud frames of the environment in and around the user with pressurized air on the skin of the user. As such, any abrasion to the skin of the user is also eliminated, which otherwise posed problems related to abrasions on the skin of the user. The nozzles of the portable electronic haptic vision device are configured to move along the body parts of the user, and are embedded in wearables, such as t-shirt, belt, pants, helmet, headband or the like.

The invention has been explained above with reference to the aforementioned embodiments. However, it is clear that the invention is not only restricted to these embodiments, but comprises all possible embodiments within the spirit and scope of the inventive thought and the following patent claims.

What is claimed is:

1. A portable electronic haptic vision device, configured to be at least one of attached to or worn by a user, and arranged to provide haptic feedback with pressurized air on skin of the user based upon detected objects in the surroundings of the user, wherein information about the detected objects in the surroundings is captured using at least one of a digital camera, a 3-D capturing device, a 3-D scanner, a radar, or a sonar device coupled to the portable electronic haptic vision device, wherein the information about the detected objects in the surroundings is recorded as at least one of video or a 3D point cloud, wherein the information about the detected objects in the surroundings relates to spatial surroundings around the user and is captured with a 360 degree field of view from the portable electronic haptic vision device, and wherein the portable electronic haptic vision device is configured to:

track an eye of the user and perform an eye-track action comprising at least one of: (i) zooming a camera in or out, (ii) photographing surroundings, or (iii) videoing surroundings, based upon the eye tracking of the user, and draw a symbol on the skin of the user using pressurized air, wherein the symbol is based upon at least one of an image, a video, or a 3-D point cloud relating to the eye-track action, and wherein the symbol relates to at least one of: (i) a route, (ii) a pedestrian walkway, (iii) a street, (iv) stairs, (v) a corridor, (vi) furniture, (vii) a wall, (viii) an obstacle, (ix) an impression or expression from another person's face, or (x) a video signal obtained from a screen.

2. A portable electronic haptic vision device, as claimed in claim 1, wherein information about the detected objects in the surroundings are captured within the field of view of the user, creating a sense-based vision.

3. A portable electronic haptic vision device, as claimed in claim 1, wherein the portable electronic haptic vision device comprises at least one of the following: a helmet, a shirt, a belt or another wearable.

4. A portable electronic haptic vision device, as claimed in claim 1, wherein the portable electronic haptic vision device comprises a light to illuminate surroundings of the user.

5. A portable electronic haptic vision device, as claimed in claim 4, wherein the light comprises at least one of an LED, a narrow emission band LED, an infrared light, a flash, or another low power light.

6. A portable electronic haptic vision device, as claimed in claim 1, wherein the user is at least one of blind or a gaming user playing a virtual reality game.

7. A portable electronic haptic vision device, as claimed in claim 1, wherein the pressurized air is configured to be directed to the skin of the user via at least one of a: (i) nozzle, (ii) straw, (iii) pipe or (iv) funnel.

8. A portable electronic haptic vision device, as claimed in claim 1, wherein the portable electronic haptic vision device is connected to another peripheral device on the same user providing haptic feedback.

9. A software program product for a portable electronic haptic vision device, configured to be at least one of attached to or worn by a user, and arranged to provide haptic feedback with pressurized air on skin of the user based upon detected objects in the surroundings of the user, the software program product comprising a non-transitory computer-readable storage medium having computer-readable program code embodied therewith, the computer-readable program code executable by one or more computer processors to perform an operation, the operation comprising:
   capturing information about the detected objects in the surroundings using at least one of a digital camera, a 3-D capturing device, a 3-D scanner, a radar, or a sonar device coupled to the portable electronic haptic vision device;
   recording the information about the detected objects in the as at least one of video or a 3D point cloud, wherein the information about the detected objects in the surroundings relates to spatial surroundings around the user and is captured with a 360 degree field of view from the portable electronic haptic vision device;
   tracking an eye of the user and performing an eye-track action comprising at least one of: (i) zooming a camera in or out, (ii) photographing surroundings, or (iii) videoing surroundings, based upon the eye tracking of the user; and
   drawing a symbol on the skin of the user using pressurized air, wherein the symbol is based upon at least one of an image, a video, or a 3-D point cloud relating to the eye-track action, and wherein the symbol relates to at least one of: (i) a route, (ii) a pedestrian walkway, (iii) a street, (iv) stairs, (v) a corridor, (vi) furniture, (vii) a wall, (viii) an obstacle, (ix) an impression or expression from another person's face, or (x) a video signal obtained from a screen.

10. A software program product as claimed in claim 9, wherein the symbol is drawn on the skin of the user using at least one nozzle to spray the pressurized air, at least one pump, and a valve controller.

11. A software program product as claimed in claim 9, wherein information about the detected objects in the surroundings is captured within a field of view of the user, creating a sense based vision.

12. A software program product as claimed in claim 9, wherein portable electronic haptic vision device comprises at least one of the following: a helmet, a shirt, a belt, or another wearable.

13. A software program product as claimed in claim 9, wherein the portable electronic haptic vision device comprises a light to illuminate surroundings of the user.

14. A software program product as claimed in claim 13, wherein the light comprises at least one of an LED, a narrow emission band LED, an infrared light, a flash, or another low power light.

15. A software program product as claimed in claim 9, wherein the user is at least one of blind or a gaming user playing a virtual reality game.

16. A software program product as claimed in claim 9, wherein the pressurized air is configured to be directed to the skin of the user via at least one of a: (i) nozzle, (ii) straw, (iii) pipe or (iv) funnel.

17. A software program product as claimed in claim 9, wherein the portable electronic haptic vision device is connected to another peripheral device on the same user providing haptic feedback.

18. A method for operating a portable electronic haptic vision device, configured to be at least one of attached to or worn by a user, and arranged to provide haptic feedback with pressurized air on skin of the user based upon detected objects in the surroundings of the user, the method comprising:
   capturing information about the detected objects in the surroundings using at least one of a digital camera, a 3-D capturing device, a 3-D scanner, a radar, or a sonar device coupled to the portable electronic haptic vision device;
   recording the information about the detected objects in the surroundings as at least one of video or a 3D point cloud, wherein the information about the detected objects in the surroundings relates to spatial surroundings around the user and is captured with a 360 degree field of view from the portable electronic haptic vision device;
   tracking an eye of the user and performing an eye-track action comprising at least one of: (i) zooming a camera in or out, (ii) photographing surroundings, or (iii) videoing surroundings, based upon the eye tracking of the user; and
   drawing a symbol on the skin of the user using pressurized air, wherein the symbol is based upon at least one of an image, a video, or a 3-D point cloud relating to the eye-track action, and wherein the symbol relates to at least one of: (i) a route, (ii) a pedestrian walkway, (iii) a street, (iv) stairs, (v) a corridor, (vi) furniture, (vii) a wall, (viii) an obstacle, (ix) an impression or expression from another person's face, or (x) a video signal obtained from a screen.

19. A method as claimed in claim 18, wherein the symbol is drawn on the skin of the user using at least one nozzle to spray the pressurized air, at least one pump, and a valve controller at least one pump and valve controller.

20. A method as claimed in claim 18, wherein capturing information about the detected objects in the surroundings within the field of view of the user, creates a sense based vision for the user.

21. A method as claimed in claim 18, wherein the portable electronic haptic vision device comprises at least one of the following: a helmet, a shirt, a belt, or another wearable.

22. A method as claimed in claim 18, wherein the portable electronic haptic vision device comprises a light to illuminate surroundings of the user.

23. A method as claimed in claim 22, wherein the light comprises at least one of an LED, a narrow emission band LED, an infrared light, a flash, or another low power light.

24. A method as claimed in claim 18, wherein the user is at least one of blind or a gaming user playing a virtual reality game.

25. A method as claimed in claim 18, wherein the pressurized air is configured to be directed to the skin of the user via at least one of a: (i) nozzle, (ii) straw, (iii) pipe or (iv) funnel.

26. A method as claimed in claim 18, wherein the portable electronic haptic vision device is connected to another peripheral device on the same user providing haptic feedback.

27. The portable electronic haptic vision device of claim 3, wherein the portable electronic haptic vision device comprises a helmet with at least two cameras place in front the position of the eyes of the user.

28. The portable electronic haptic vision device of claim 8, wherein the other peripheral device on the same user provides haptic feedback using pressurized air.

29. The software program product of claim 12, wherein the portable electronic haptic vision device comprises a helmet with at least two cameras place in front the position of the eyes of the user.

30. The software program product of claim 17, wherein the other peripheral device on the same user provides haptic feedback using pressurized air.

31. The method of claim 22, wherein the portable electronic haptic vision device comprises a helmet with at least two cameras place in front the position of the eyes of the user.

32. The method of claim 26, wherein the other peripheral device on the same user provides haptic feedback using pressurized air.

\* \* \* \* \*